(12) United States Patent
Nelson

(10) Patent No.: US 12,703,084 B2
(45) Date of Patent: Aug. 11, 2026

(54) VARIABLE-STIFFNESS MECHANISM

(71) Applicant: NUtech Ventures, Lincoln, NE (US)

(72) Inventor: Carl Nelson, Lincoln, NE (US)

(73) Assignee: NUtech Ventures, Lincoln, NE (US)

( * ) Notice: Subject to any disclaimer, the term of this patent is extended or adjusted under 35 U.S.C. 154(b) by 1 day.

(21) Appl. No.: 18/900,224

(22) Filed: Sep. 27, 2024

(65) Prior Publication Data

US 2025/0108503 A1 Apr. 3, 2025

Related U.S. Application Data

(60) Provisional application No. 63/586,671, filed on Sep. 29, 2023.

(51) Int. Cl.
*B25J 9/00* (2006.01)
*B25J 9/10* (2006.01)

(52) U.S. Cl.
CPC ............. *B25J 9/1035* (2013.01); *B25J 9/104* (2013.01)

(58) Field of Classification Search
CPC ......... B25J 9/1035; B25J 9/104; F16H 55/26; F16H 19/04
See application file for complete search history.

(56) References Cited

U.S. PATENT DOCUMENTS

| | | | |
|---|---|---|---|
| 8,789,630 | B2 | 7/2014 | Galloway et al. |
| 10,040,206 | B2 | 8/2018 | Jeong et al. |
| 11,986,693 | B2 | 5/2024 | Cho et al. |

FOREIGN PATENT DOCUMENTS

WO WO-2015125955 A1 * 8/2015 ............. B25J 9/102

OTHER PUBLICATIONS

Contreras-Calderon et al., "Experimental validation of a Variable Stiffness Joint based on antagonistic principle," Apr. 2022, 9 pages.
English et al., "Implementation of variable joint stiffness through antagonistic actuation using rolamite springs," Mechanism and Machine Theory 34, Oct. 31, 1996, 14 pages.
Fumagalli et al., "The mVSA-UT: a Miniaturized Differential Mechanism for a Continuous Rotational Variable Stiffness Actuator," The Fourth IEEE RAS/EMBS International Conference on Biomedical Robotics and Biomechatronics, Jun. 24-27, 2012, 6 pages.
Groothuis et al., "The vsaUT-II: a Novel Rotational Variable Stiffness Actuator," 2012 IEEE International Conference on Robotics and Automation RiverCentre, Saint Paul, Minnesota, USA, May 14-18, 2012, 6 pages.
Jafari et al., "A New Actuator with Adjustable Stiffness based on a Variable Ratio Lever Mechanism," IEEE International Conference on Robotics and Automation, Jun. 2011, 11 pages.

(Continued)

*Primary Examiner* — Randell J Krug
(74) *Attorney, Agent, or Firm* — Suiter Swantz IP

(57) ABSTRACT

A variable-stiffness mechanism may include racks, pinion gears, spring elements, a cable, and a pulley. The variable-stiffness mechanism may be based on a variable-lever principal using the racks as a lever and the pinion gears as a variable pivot point. The pinion gears may be fixed in position relative to the pulley and coupled together by a gear-to-gear mesh. Alternatively, the pinion gears may be configured to translate relative to the pulley using a central drive rack and drive motor.

23 Claims, 23 Drawing Sheets

(56) References Cited

OTHER PUBLICATIONS

Kim et al., "Hybrid Dual Actuator Unit: A Design of a Variable Stiffness Actuator based on an Adjustable Moment Arm Mechanism," 2010 IEEE International Conference on Robotics and Automation, May 3-8, 2010, 6 pages.
Lavate et al., "Variable Stiffness Actuators : A General Review," International Journal of Engineering Research & Technology, vol. 4, Issue 7, Jul. 2015, 6 pages.
Li et al., "Design and Modelling of a Compact Variable Stiffness Mechanism for Wearable Elbow Exoskeletons," 2019 IEEE 7th International Conference on Control, Mechatronics and Automation, 2019, 5 pages.
Liu et al., "Mechanical design and analysis of a novel variable stiffness actuator with symmetrical pivot adjustment," Front. Mech. Eng., May 26, 2021, 15 pages.
Nelson et al., "A redundant rehabilitation robot with a variable stiffness mechanism," Mechanism and Machine Theory 150, Mar. 20, 2020, 15 pages.
Palli et al., "Design of a Variable Stiffness Actuator Based on Flexures," Journal of Mechanisms and Robotics, vol. 3, Aug. 2011, 3 pages.
Sugar, "A novel selective compliant actuator," Mechatronics 12, 2002, 15 pages.
Tsagarakis et al., "A Compact Soft Actuator Unit for Small Scale Human Friendly Robots," 2009 IEEE International Conference on Robotics and Automation, May 12-17, 2009, 8 pages.
Tsagarakis et al., "A New Variable Stiffness Actuator (CompAct-VSA): Design and Modelling," 2011 IEEE/RSJ International Conference on Intelligent Robots and Systems, Sep. 25-30, 2011, 7 pages.
Van Ham et al., "MACCEPA, the mechanically adjustable compliance and controllable equilibrium position actuator: Design and implementation in a biped robot," Robotics and Autonomous Systems, Mar. 28, 2007, 8 pages.
Vanderborght et al., "Variable impedance actuators: A review," Robotics and Autonomous Systems 6, Aug. 6, 2013, 15 pages.
Xiong et al., "Design of a Variable Stiffness Actuator Based on Variable Radius Mechanisms," 2022 IEEE/ASME International Conference on Advanced Intelligent Mechatronics, 2022, 6 pages.
Yigit et al., "Low-cost variable stiffness joint design using translational variable radius pulleys," Mechanism and Machine Theory 130, Sep. 4, 2018, 17 pages.
Zhou et al., "A Cable Based Active Variable Stiffness Module With Decoupled Tension," Journal of Mechanisms and Robotics, vol. 7, Feb. 2015, 6 pages.

* cited by examiner

1100

1400

VARIABLE-STIFFNESS MECHANISM

CROSS-REFERENCE TO RELATED APPLICATIONS

The present application claims the benefit under 35 U.S.C. § 119(e) of U.S. Provisional Application Ser. No. 63/586,671, filed Sep. 29, 2023, titled "VARIABLE-STIFFNESS MECHANISM", which is incorporated herein by reference in the entirety.

TECHNICAL FIELD

The present disclosure generally relates to manipulators, and more particularly to actuating means with variable stiffness.

BACKGROUND

Variable stiffness has gained interest in the context of robotics in recent decades, along with methods for implementation. Several mechanical designs have been proposed for implementing variable-stiffness using spring elements. The mechanical designs include series-elastic arrangements, antagonistic springs, adjustment of spring preload, and variable levers. Advantageously, the variable-levers tends to be less energy consumptive than the other designs. However, the variable-levers use relatively complex prismatic joints to adjust the lever. Therefore, it would be advantageous to provide a device, system, and method that cures the shortcomings described above.

SUMMARY

A variable-stiffness mechanism is described, in accordance with one or more embodiments of the present disclosure. The variable-stiffness mechanism may include: a first rack and a second rack; a first pinion gear and a second pinion gear, wherein the first rack and the second rack are coupled with the first pinion gear and the second pinion gear by a first gear-to-rack mesh and a second gear-to-rack mesh, respectively, wherein the first rack and the second rack are configured to pivot about the first gear-to-rack mesh and the second gear-to-rack mesh, respectively, wherein rotation of the first pinion gear and the second pinion gear adjusts positions of the first gear-to-rack mesh and the second gear-to-rack mesh along the first rack and the second rack, respectively; a first spring element and a second spring element, wherein the first spring element and the second spring element couple to the first rack and the second rack, respectively; a cable, wherein the cable is coupled between the first rack and the second rack, wherein the first gear-to-rack mesh and the first pinion gear are laterally disposed between the first spring element and the cable, wherein the second gear-to-rack mesh and the second pinion gear are laterally disposed between the second spring element and the cable; and a pulley, wherein the cable is coupled with the pulley, wherein the first pinion gear, the second pinion gear, the pulley, and the cable are vertically disposed between the first rack and the second rack.

A system is described, in accordance with one or more embodiments of the present disclosure. The system may include: a variable-stiffness mechanism including: a first rack and a second rack; a first pinion gear and a second pinion gear, wherein the first rack and the second rack are coupled with the first pinion gear and the second pinion gear by a first gear-to-rack mesh and a second gear-to-rack mesh, respectively, wherein the first rack and the second rack are configured to pivot about the first gear-to-rack mesh and the second gear-to-rack mesh, respectively, wherein rotation of the first pinion gear and the second pinion gear adjusts positions of the first gear-to-rack mesh and the second gear-to-rack mesh along the first rack and the second rack, respectively; a first spring element and a second spring element, wherein the first spring element and the second spring element couple to the first rack and the second rack, respectively; a cable, wherein the cable is coupled between the first rack and the second rack, wherein the first gear-to-rack mesh and the first pinion gear are laterally disposed between the first spring element and the cable, wherein the second gear-to-rack mesh and the second pinion gear are laterally disposed between the second spring element and the cable; and a pulley, wherein the cable is coupled with the pulley, wherein the first pinion gear, the second pinion gear, the pulley, and the cable are vertically disposed between the first rack and the second rack; a local ground, wherein the first spring element is coupled between the first rack and the local ground, wherein the second spring element is coupled between the second rack and the local ground; and an actuator, wherein the pulley is coupled to the actuator.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the description and drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION OF THE INVENTION

The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Reference will now be made in detail to the subject matter disclosed, which is illustrated in the accompanying drawings.

Embodiments of the present disclosure are directed to a variable-stiffness mechanism. The variable-stiffness mechanism may include racks, pinion gears, spring elements, a cable, and a pulley. The variable-stiffness mechanism may be based on a variable-lever principal using the racks as a lever and the pinion gears as a variable pivot point. The pinion gears may be fixed in position relative to the pulley and coupled together by a gear-to-gear mesh. Alternatively, the pinion gears may be configured to translate relative to the pulley using a central drive rack and drive motor.

Figure 1:
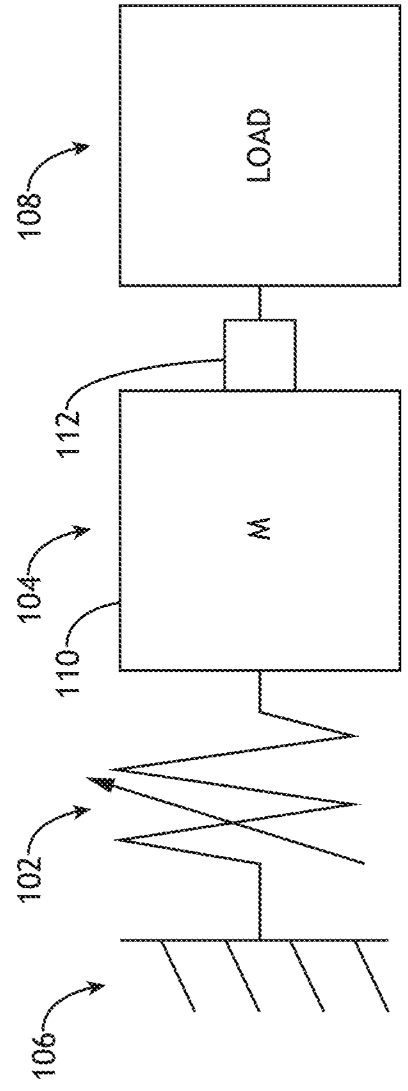
FIG. 1 depicts a simplified block diagram of a system with a variable-stiffness mechanism, in accordance with one or more embodiments of the present disclosure.

FIG. 1 depicts a simplified block diagram of a system 100, in accordance with one or more embodiments of the present disclosure. The system 100 may include a variable-stiffness mechanism 102, an actuator 104, a local ground 106, and/or a load path 108.

The variable-stiffness mechanism 102 may couple between the actuator 104 and the local ground 106. The variable-stiffness mechanism 102 may be located upstream of the actuator 104 in the load path 108 by coupling between the actuator 104 and the local ground 106. One advantage of coupling the variable-stiffness mechanism 102 between the actuator 104 and the local ground 106 is that the stiffness adjustment by the variable-stiffness mechanism 102 may be actuated locally, independent of a nominal position of the actuator 104.

The actuator 104 may be a motor, a main actuator, or the like. The actuator 104 may be a rotary actuator. The actuator 104 may include a stator 110 and/or a rotor 112. The rotor 112 may be configured to rotate relative to the stator 110. The rotor 112 may couple to the load path 108 by which the rotor 112 is configured to rotate the load path 108. Since the variable-stiffness mechanism 102 is upstream of the actuator 104, the system 100 may permit continuous rotation of the rotor 112.

The variable-stiffness mechanism 102 may receive a primary torque ($T_M$) from the actuator 104. The primary torque ($T_M$) may be generated by the actuator 104 in response to turning and/or stopping the rotor 112. The variable-stiffness mechanism 102 may couple the primary torque ($T_M$) into the local ground 106. The local ground 106 may be a mounting point which receives the primary torque ($T_M$).

The variable-stiffness mechanism 102 may include a stiffness. The stiffness may control the coupling of the primary torque ($T_M$) into the local ground 106 The variable-stiffness mechanism 102 may be configured to adjust the stiffness such that the stiffness if variable and/or tunable. The primary torque ($T_M$) seen at the pulley 208 may be modulated through the pinion gears 204. The variable-stiffness mechanism 102 may provide a higher compliance and/or a lower stiffness which allows for more energy efficient applications by decreasing loads on the actuator 104. The variable-stiffness mechanism 102 may allow the actuator 104 to perform tasks that would exceed a critical load threshold of the variable-stiffness mechanism 102 thus preventing breakage.

Figure 2A:
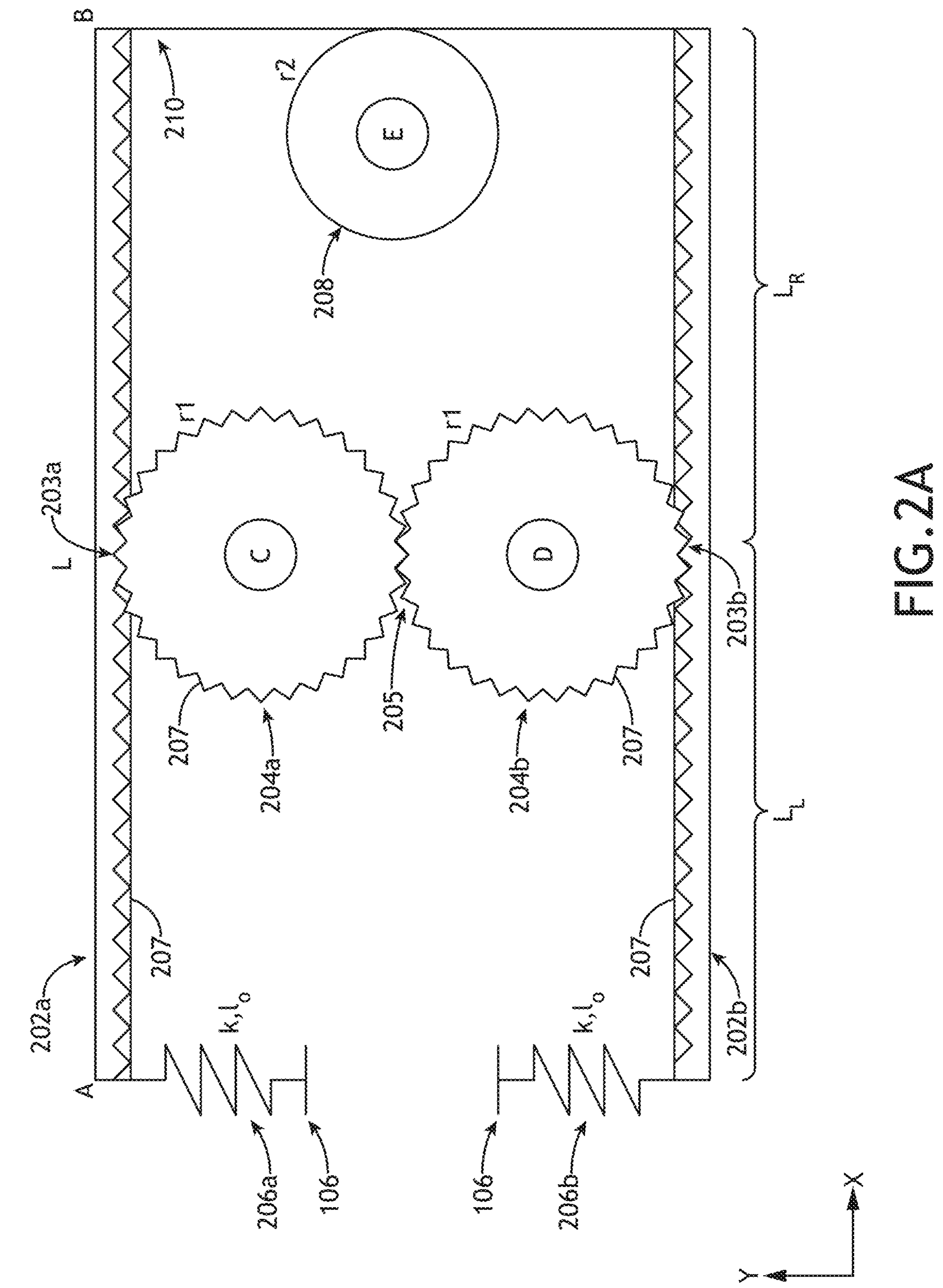
FIGS. 2A-2B depict the variable-stiffness mechanism, in accordance with one or more embodiments of the present disclosure.
Figure 2B:
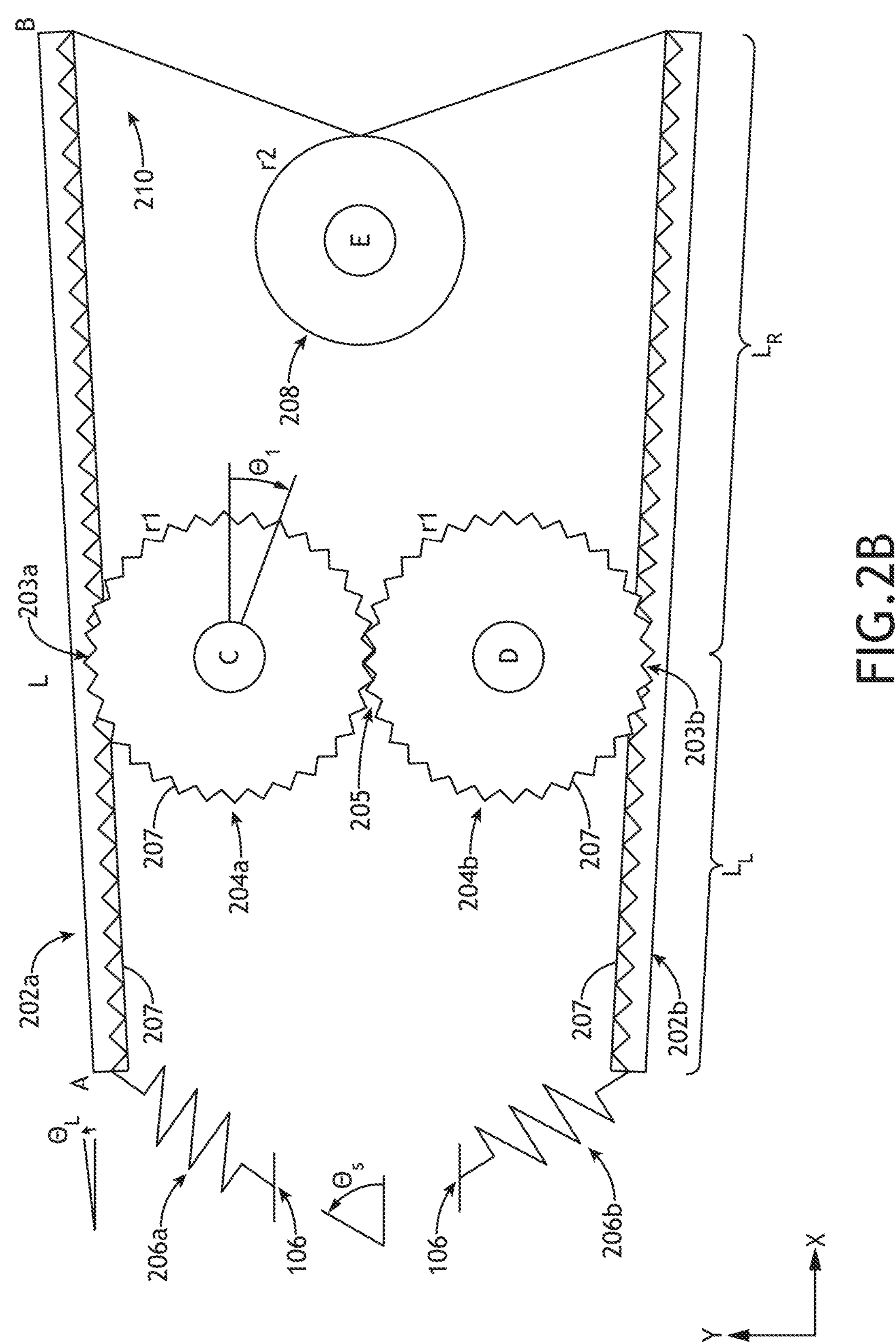

FIGS. 2A-2B depict the variable-stiffness mechanism 102, in accordance with one or more embodiments of the present disclosure. The variable-stiffness mechanism 102 may include racks 202 (e.g., first rack 202*a*, second rack 202*b*), pinion gears 204 (e.g., a first pinion gear 204*a*, a second pinion gear 204*b*), spring elements 206 (e.g., first spring element 206*a*, second spring element 206*b*), a pulley 208, and/or a cable 210. The variable-stiffness mechanism 102 may be based on a variable-lever principal using the racks 202 as the lever and the pinion gears 204 as the variable pivot point.

The racks 202 may be linear gears. The racks 202 may include a rack length (L). The racks 202 may include a first end (A) and a second end (B). The rack length (L) may be the distance between the first end (A) and the second end (B). The first rack 202*a* and the second rack 202*b* may each include the same rack length (L). The racks 202 and pinion gears 204 may function both as a lever with a variable pivot point and as part of the stiffness-adjustment transmission mechanism.

The pinion gears 204 may be an external gear. The pinion gears 204 may include a pinion radius ($r_1$). The pinion gears 204 may each have the same pinion radius ($r_1$). The pinion gears 204 may include center axes about which the pinion gears 204 are configured to rotate. For example, the first pinion gear 204*a* may include a center axis (C) about which the first pinion gear 204*a* is configured to rotate. By way of another example, the second pinion gear 204*b* may include a center axis (D) about which the second pinion gear 204*b* is configured to rotate.

The pinion gears 204 may be disposed between the racks 202. For example, the first pinion gear 204*a* and the second pinion gear 204*b* may be disposed between the first rack 202*a* and the second rack 202*b*. For instance, the pinion gears 204 may be vertically disposed between the racks 202.

The racks 202 may couple with the pinion gears 204 by gear-to-rack meshes 203. The gear-to-rack meshes 203 may also be referred to as a contact points, pivot points, or the like. For example, the first rack 202*a* may couple with the first pinion gear 204*a* by a first gear-to-rack mesh 203*a*. By way of another example, the second rack 202*b* may couple with the second pinion gear 204*b* by a second gear-to-rack mesh 203*b*.

The gear-to-rack meshes 203 may be between the first end (A) and the second end (B) of the racks 202. The distance from the first end (A) of the racks 202 to the gear-to-rack meshes 203 may be defined as a left partial length ($L_L$) and/or a moment arm for the spring force from the spring elements 206 to the gear-to-rack meshes 203. The distance from the gear-to-rack meshes 203 to the second end (B) of the racks 202 may be defined as a right partial length ($L_R$) and/or a moment arm for the cable force from the cable 210 to the gear-to-rack meshes 203. The sum of the left partial length ($L_L$) and the right partial length ($L_R$) may be the rack length (L).

The first gear-to-rack mesh 203*a* and the second gear-to-rack mesh 203*b* may be at a same relative position along the rack length (L) of the first rack 202*a* and the second rack 202*b*. For example, the distance from the first end (A) of the first rack 202*a* to the first gear-to-rack mesh 203*a* may be a same distance as from the first end (A) of the second rack 202*b* to the second gear-to-rack mesh 203*b*. By way of another example, the distance from the first gear-to-rack mesh 203*a* to the second end (B) of the first rack 202*a* may be a same distance as from the second gear-to-rack mesh 203*b* to the second end (B) of the second rack 202*b*.

The racks 202 and the pinion gears 204 may each include teeth 207 by which the racks 202 and the pinion gears 204 couple via the gear-to-rack meshes 203 and/or the gear-to-gear mesh 205. The teeth 207 may include any suitable type of teeth, such as, but not limited to, straight teeth, helical teeth, worm teeth, or the like. The teeth 207 of the racks 202 may extend along the rack length (L). The teeth 207 of the pinion gears 204 may face radially outwards from the center axes of the pinion gears 204. The racks 202 and the pinion gears 204 may include any number of the teeth 207. The teeth 207 may include any suitable tooth profile, pitch, modulus, root, and the like.

The spring elements 206 may be tension springs and/or compression springs. The spring elements 206 may include any tension and/or compression spring, such as, but not limited to, a coil spring or the like. The spring elements 206 may include a stiffness (k) and free length ($l_0$). The stiffness (k) of the first spring element 206*a* and the second spring element 206*b* may be the same. The free length ($l_0$) of the first spring element 206*a* and the second spring element 206*b* may be the same.

The spring elements 206 may couple to the racks 202. For example, the first spring element 206*a* may couple to the first rack 202*a* and the second spring element 206*b* may couple to the second rack 202*b*. The spring elements 206 may couple to the first end (A) of the racks 202. For example, the first end (A) of the first rack 202*a* and second rack 202*b* may couple to the first spring element 206*a* and the second spring element 206*b*, respectively.

The spring elements 206 may couple between the racks 202 and the local ground 106. For example, the first spring element 206*a* may couple between the first rack 202*a* and the local ground 106. By way of another example, the second spring element 206*b* may couple between the second rack 202*b* and the local ground 106. The spring elements 206 may couple between the first end (A) of the racks 202 and the local ground 106. For example, the spring elements 206 may couple between the first end (A) of the racks 202 and the local ground 106. For instance, the first spring element 206*a* may couple between the first end (A) of the first rack 202*a* and the local ground 106. By way of another instance, the second spring element 206*b* may couple between the first end (A) of the second rack 202*b* and the local ground 106.

The spring elements 206 may apply spring forces on the first end (A) of the racks 202. The spring forces may provide compliance to the variable-stiffness mechanism 102.

The pulley 208 may include a pulley radius ($r_2$). The pulley radius ($r_2$) may be larger than, the same as, or smaller than the pinion radius ($r_1$). The pulley 208 may include a center axis (E) about which the pulley 208 is configured to rotate.

The center axes of the pinion gears 204 (i.e., center axis (C), center axis (D)) and/or the pulley 208 (i.e., center axis (E)) may be arranged in parallel. For example, the center axes may each be orthogonal to the racks 202. The center axes may not be coincident. For example, the center axes of the pinion gears 204 (i.e., center axis (C), center axis (D)) and/or the pulley 208 (i.e., center axis (E)) may be laterally and/or vertically offset from each other.

In some embodiments, the center axes of the pinion gears 204 (i.e., center axis (C), center axis (D)), the center axis (E) of the pulley 208, and/or the local ground 106 may be fixed in position relative to each other. The pinion gears 204 may not be configured to translate relative to the pulley 208 and/or the local ground 106.

The cable 210 may couple with the pulley 208. For example, a middle section of the cable 210 may be wound over the pulley 208 by which the cable 210 may couple with the pulley 208. The cable 210 may be wound over the pulley 208 with any number of turns, including a partial turn, a whole turn, or more.

The cable 210 may couple between the racks 202. For example, the first rack 202*a* and the second rack 202*b* may couple to opposing ends of the cable 210. The second end (B) of the racks 202 may couple to the cable 210. For example, the second end (B) of the first rack 202*a* and the second rack 202*b* may couple to opposing ends of the cable 210. Thus, the cable 210 may couple the second end (B) of the racks 202 and the pulley 208.

The pulley 208 may couple to the actuator 104. The pulley 208 may couple the cable 210 to the actuator 104. For example, the pulley 208 may couple the cable 210 to the stator 110 of the actuator 104. Thus, the second end (B) of the racks 202 may be coupled to the actuator 104 through the pulley 208 and the cable 210.

The spring elements 206, the pulley 208, and/or the cable 210 may be disposed between the racks 202. For example, the spring elements 206, the pulley 208, and/or the cable 210 may be vertically disposed between the racks 202. Although the spring elements 206 are described as being disposed between the racks 202, this is not intended as a limitation of the present disclosure. It is further contemplated that the racks 202 may be disposed between the spring elements 206.

The gear-to-rack meshes 203 and/or the pinion gears 204 may be disposed between the spring elements 206 and the cable 210. For example, the first gear-to-rack mesh 203*a* and/or the first pinion gear 204*a* may be disposed between the first spring element 206*a* and the cable 210. By way of another example, the second gear-to-rack mesh 203*b* and/or the second pinion gear 204*b* may be disposed between the second spring element 206*b* and the cable 210. The pinion gears 204 may also be disposed between the spring elements 206 and the pulley 208. For instance, the gear-to-rack meshes 203 and/or the pinion gears 204 may be laterally disposed between the spring elements 206 and the cable 210 and/or the pulley 208.

The spring elements 206 and/or the cable 210 may be under tension. Tension in the spring elements 206 and/or the cable 210 may pull the racks 202 against the pinion gears 204, thereby forming the gear-to-rack meshes 203. The spring elements 206 and/or the cable 210 may tension the racks 202 against the pinion gears 204, forming the gear-to-rack meshes 203. For example, the first spring element 206*a* and the cable 210 may tension the first rack 202*a* against the first pinion gear 204*a*, forming the first gear-to-rack mesh 203*a*. By way of another example, the second spring element 206*b* and the cable 210 may tension the second rack 202*b* against the second pinion gear 204*b*, forming the second gear-to-rack mesh 203*b*.

The racks 202 may be configured to pivot about the gear-to-rack meshes 203 and/or the pinion gears 204. The gear-to-rack meshes 203 may form a pivot point by which the racks 202 are configured to pivot about the pinion gears 204. For example, the first rack 202*a* may pivot about the first gear-to-rack mesh 203*a* with the first pinion gear 204*a*. By way of another example, the second rack 202*b* may pivot about the second gear-to-rack mesh 203*b* with the second pinion gear 204*b*. Such arrangement of the racks 202 pivoting about the gear-to-rack meshes 203 with the pinion gears 204 between the first end (A) and the second end (B) may cause the racks 202 to be class—1 levers.

The variable-stiffness mechanism 102 may include a lever ratio defined by the position of the gear-to-rack meshes 203 along the racks 202. The lever ratio may also be referred to as mechanical advantage. For example, the first rack 202*a* may include a first lever ratio defined by the position relative to the first gear-to-rack mesh 203*a* with the first pinion gear 204*a*. By way of another example, the second rack 202*b* may include a second lever ratio defined by the position relative to the second gear-to-rack mesh 203*b* with the second pinion gear 204*b*. The lever ratio may be defined by the position of the gear-to-rack meshes 203 between the racks 202 and the pinion gears 204 relative to the first end (A) and the second end (B). For example, the first lever ratio may be the distance from the first end (A) of the first rack 202*a* to the first gear-to-rack mesh 203*a* over the distance from the first gear-to-rack mesh 203*a* to the second end (B) of the first rack 202*a*. By way of another example, the second lever ratio may be the distance from the first end (A) of the second rack 202*b* to the second gear-to-rack mesh 203*b* over the distance from the second gear-to-rack mesh 203*b* to the second end (B) of the second rack 202*b*.

The lever ratio of the racks 202 may or may not be the same. For example, the first lever ratio and the second lever ratio may be the same where the racks 202 are a same length, the spring elements 206 are coupled to the first end (A) of the racks 202, the center axes of the pinion gears 204 are aligned, and the cable 210 is coupled to the second end (B) of the racks 202.

The variable-stiffness mechanism 102 may include a neutral position. The racks 202 may be at a rack angle ($\Theta_L$) relative to the pinion gears 204 and/or the x-axis. The neutral position may be defined as having a rack angle ($\Theta_L$) of zero. The spring elements 206 and the cable 210 may be at any angle when the variable-stiffness mechanism 102 is in the neutral position. For example, the spring elements 206 and the cable 210 are shown as vertical and orthogonal to the racks 202 in the neutral position, although this is not intended to be limiting. The gear-to-rack meshes 203 may be at any length along the racks 202 when the variable-stiffness mechanism 102 is in the neutral position. For example, the gear-to-rack meshes 203 is depicted midway along the racks 202 in the neutral position, although this is not intended to be limiting.

The position of the racks 202 may be adjusted relative to the pinion gears 204, the local ground 106, the pulley 208, and/or the actuator 104. The rotation of the pinion gears 204 may adjust the lever ratio. The racks 202 may be adjusted by and pivot on the pinion gears 204.

Rotation of the pinion gears 204 may adjust the position of the gear-to-rack meshes 203 along the length of the racks 202 and/or adjust the position of the racks 202 relative to the pinion gears 204. For example, the rotation of the first pinion gear 204*a* may adjust a position of the first gear-to-rack mesh 203*a* along the first rack 202*a*. By way of another example, rotation of the second pinion gear 204*b* may adjust a position of the second gear-to-rack mesh 203*b* along the second rack 202*b*. Adjusting the position of the gear-to-rack meshes 203 along the length of the racks 202 may change the left partial length ($L_L$) and the right partial length ($L_R$) thereby adjusting the lever ratio.

In some embodiments, the variable-stiffness mechanism 102 may be configured such that the pinion gears 204 may translate the position of the gear-to-rack meshes 203 along the racks 202 while the pinion gears 204 remain at the fixed position relative to the pulley 208 and/or the local ground 106. For example, the first pinion gear 204*a* may be configured to translate the first gear-to-rack mesh 203*a* along the first rack 202*a* and the second pinion gear 204*b* may be configured to translate the second gear-to-rack mesh 203*b* along the second rack 202*b* while the first pinion gear 204*a* and the second pinion gear 204*b* remain at fixed positions relative to the pulley 208 and/or the local ground 106.

The position of the gear-to-rack meshes 203 along the racks 202 may also change the amount of displacement in the cable 210 and in the spring elements 206.

The lever ratio and/or the input force on the second end (B) of the racks 202 may determine the spring forces acting at the first end (A) of the racks 202. The racks 202 may be static under the input force. The spring forces acting at the first end (A) may achieve equilibrium with the force and the second end (B) due to the primary torque ($T_m$) and a force through the gear-to-rack meshes 203 between the racks 202 and the pinion gears 204. For example, the sum of forces and bending moments may be zero about the gear-to-rack meshes 203 between racks 202 and the pinion gears 204. The pivoting of the racks 202 about the gear-to-rack meshes 203 may provide a nonlinear load-displacement relationship for the force through the gear-to-rack meshes 203.

The variable-stiffness mechanism 102 may include a stiffness at the pulley 208. The stiffness may be defined by the position of the gear-to-rack meshes 203 along the racks 202. The variable-stiffness mechanism 102 may provide variable-stiffness by adjusting the position of the gear-to-rack meshes 203 and/or the lever ratio. Adjusting the position of the gear-to-rack meshes 203 and/or the lever ratio may adjust the stiffness at the pulley 208. A lowest stiffness of the variable-stiffness mechanism 102 may be where the gear-to-rack meshes 203 are at the first end (A) of the racks 202. A highest stiffness of the variable-stiffness mechanism 102 may be where the gear-to-rack meshes 203 are at the second end (B) of the racks 202. The stiffness of the variable-stiffness mechanism 102 may increase as the gear-to-rack meshes 203 translate from the first end (A) to the second end (B) of the racks 202. The range of motion of the gear-to-rack meshes 203 along the racks 202 may allow the variable-stiffness mechanism 102 to vary the stiffness from very high to very low values. The stiffness may be variable by changing the position of the first gear-to-rack mesh 203*a* and the second gear-to-rack mesh 203*b* along the first rack 202*a* and the second rack 202*b*, respectively.

The stiffness at the pulley 208 may be the primary torque ($T_M$). The primary torque ($T_M$) may be applied at the center axis (E) of the pulley 208. The primary torque ($T_M$) may also be referred to as a rotational output or a load. The primary torque ($T_M$) may be the rotational stiffness of the variable-stiffness mechanism 102. The variable-stiffness mechanism 102 may provide a wide range of the primary torque ($T_M$) using variable-lever principles.

The primary torque ($T_M$) may be from the actuator 104. For example, the primary torque ($T_M$) may be from the stator 110 of the actuator 104. The actuator 104 may transmit the primary torque ($T_M$) to the pulley 208 via the stator 110 as the rotor 112 acts on the load path 108.

The primary torque ($T_M$) may be transmitted through the pulley 208 and the cable 210 to the racks 202 at the second end (B). The primary torque ($T_M$) may be resisted by a torque from the spring elements 206 at the first end (A). The variable-stiffness mechanism 102 may resist the primary torque ($T_M$) via the spring elements 206. The spring elements 206 may provide an efficient method of variable stiffness due to the conservative energy storage and return properties of the spring elements 206. Thus, the variable-stiffness mechanism 102 may provide stiffness to resist the primary torque ($T_M$) received by the pulley 208.

The variable-stiffness mechanism 102 may be symmetric. For example, the racks 202, the pinion gears 204, the spring elements 206 and/or the cable 210 may be symmetric about the pulley 208. The symmetry of the variable-stiffness mechanism 102 may cause the equilibrium position when there is zero primary torque ($T_M$) on the pulley 208 to be constant for any position of the gear-to-rack meshes 203 along the length of the racks 202. Having both the first rack 202*a* and the second rack 202*b* may allow the neutral position to be independent of the stiffness input setting.

In some embodiments, the pinion gears 204 may be coupled by a gear-to-gear mesh 205. The gear-to-gear mesh 205 may be between the first pinion gear 204*a* and the second pinion gear 204*b*.

The pinion gears 204 may symmetrically adjust the position of the racks 202. For example, the pinion gears 204 may symmetrically adjust the positions of the racks 202 because the pinion gears 204 have the same radius and are coupled by the gear-to-gear mesh 205. The gear-to-rack meshes 203 and the gear-to-gear mesh 205 may be aligned at a same length along the racks 202. Thus, the pinion gears 204 may be a single coupled input to adjust the position of the racks 202 and the lever ratios.

Either of the pinion gears 204 may be used to adjust the racks 202 and/or the other of the pinion gears 204. The first pinion gear 204*a* and/or the second pinion gear 204*b* may be a drive pinion gear. For example, the first pinion gear 204*a* may be a drive pinion gear which adjust the racks 202 and the second pinion gear 204*b*. By way of another example, the second pinion gear 204*b* may be a drive pinion gear which adjust the racks 202 and the first pinion gear 204*a*. Thus, rotating either of the pinion gears 204 may displace the racks 202 and change the lever ratio.

Kinematic and force equilibrium models of the variable-stiffness mechanism 102 are now described.

If the first pinion gear 204*a* centered at center axis (C) is located at $\{x_1, h_1\}$ and rotated to a pinion angle ($\Theta_1$), tangency between the first pinion gear 204*a* and the first rack 202*a* dictates that the first end position $\{x_A, y_A\}$ of the first end (A) and the second end position $\{x_B, y_B\}$ of the second end (B) of the first rack 202*a* may be expressed as follows:

$$x_A = x_1 - r_1\sin(\theta_L) - L_L\cos(\theta_L)$$

$$y_A = h_1 + r_1\cos(\theta_L) - L_L\sin(\theta_L)$$

$$x_B = x_1 - r_1\sin(\theta_L) + L_R\cos(\theta_L)$$

$$y_B = h_1 + r_1\cos(\theta_L) + L_R\sin(\theta_L)$$

The spring angle ($\Theta_s$) of the first spring element 206*a* acting at the first end (A) of the first rack 202*a* may be expressed as:

$$\theta_s = \operatorname{atan}\left(\frac{y_A - y_s}{x_A - x_s}\right)$$

Where the mount location $\{x_s, y_s\}$ of the first spring element 206*a* at the local ground 106 may be determined by the amount of initial preload in the first spring element 206*a* at the neutral position and the free length ($l_0$). The magnitude of the spring force ($f_s$) at the first end (A) may be expressed as:

$$f_s = k\left(\sqrt{(y_A - y_s)^2 + (x_A - x_s)^2} - l_0\right)$$

At the second end (B) of the racks 202, the cable length ($l_{cable}$) and cable angle ($\Theta_{cable}$) of the cable 210 may be determined by tangency constraints on the pulley 208 and may be expressed as:

$$l_{cable} = \sqrt{(y_B - h_2)^2 + (x_B - x_2)^2 - r_2^2}$$

-continued $$\theta_{Cable} = \operatorname{atan}\left(\frac{y_B - h_2}{x_B - x_2}\right) + \operatorname{atan}\left(\frac{r_2}{l_{cable}}\right)$$

Where the pulley 208 centered at center axis (E) is located at $\{x_2, h_2\}$. The rotation of the pulley 208 may be based on the change in the cable length ($l_{cable}$) from the neutral position.

The second rack 202*b* may include the same equations and geometry as the first rack 202*a*. Taken together, a relationship between the primary torque ($T_M$) applied at the pulley 208 and an angular displacement of the pulley 208 may preserve equilibrium of the moments applied to each of the racks 202. The primary torque ($T_M$) applied at the pulley 208 as a function of angles of the racks 202 may be expressed as:

$$T_m = r_2(t_2 - t_1)$$

Where $t_1$ is a first cable tension in the cable 210 between the first rack 202*a* and the pulley 208, and where $t_2$ is a second cable tension in the cable 210 between the pulley 208 and the second rack 202*b*. Cable tension ($t_i$) for the cable 210 may be expressed as:

$$t_i = \frac{f_{s,i} L_{L,i} \sin(\theta_{s,i} - \theta_{L,i})}{L_{R,i} \sin(\theta_{cable,i} - \theta_{L,i})} \quad (i = 1, 2)$$

The stiffness holding torque ($T_{st}$) involved in maintaining a certain stiffness setting and/or a nominal position of the racks 202 driven by the pinion gears 204 may be related to the axial forces carried in the racks 202 and may be expressed as:

$$T_{st} = r_1(-t_1\cos(\theta_{cable,1} - \theta_{L,1}) + t_2\cos(\theta_{cable,2} - \theta_{L,2}) - f_{s,1}\cos(\theta_{s,1} - \theta_{L,1}) + f_{s,2}\cos(\theta_{s,2} - \theta_{L,2}))$$

It is desirable to both minimize the stiffness holding torque ($T_{st}$) and achieve large variation in the relationship of the primary torque ($T_M$) vs. the rack angle ($\Theta_L$). The design freedoms available to affect these outcomes include the locations of the center axes (i.e., center axis C, center axis D, center axis E), the rack length (L), the position of the racks 202 relative to the pinion gears 204 at the neutral configuration, the spring properties and preload, the pinion radius ($r_1$), and/or the pulley radius ($r_2$).

FIGS. 3A-7 depict graphs, in accordance with one or more embodiments of the present disclosure. The graphs are simulation results of the variable-stiffness mechanism 102. The rack angle ($\Theta_L$) was varied from −20 to 20 degrees, and the pinion angle ($\Theta_1$) was varied such that nominal translation of the racks 202 would keep the gear-to-rack meshes 203 within the middle 80% of the length (L) of the racks 202. The following properties were used: $x_1=1$, $h_1=2$, $x_2=1.5$, $h_2=-1$, $r_1=r_2=0.25$, and L=2, with the racks 202 initially centered on the pinion gears 204. Spring properties were set as k=1 and $I_0=1$, with 125% initial preload extension. It is further contemplated that the parameters of the variable-stiffness mechanism 102 may be optimized for an expected operating range of stiffness settings of the system 100. The parameters may also be optimized to reduce the stiffness holding torque ($T_{st}$) required to hold a given primary torque ($T_M$).

Figure 3A:
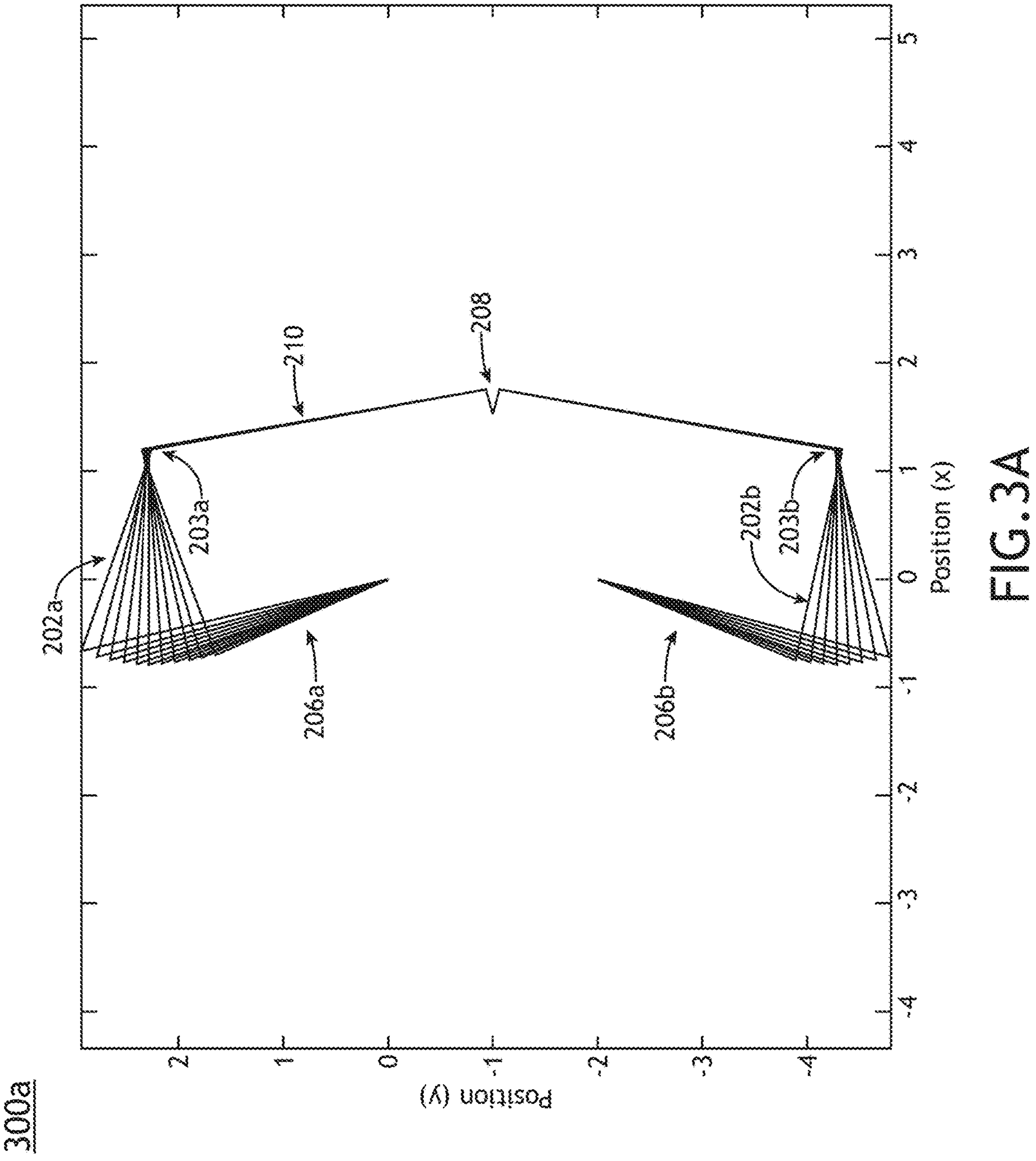
FIGS. 3A-3C, 4, 5, 6A-6B, and 7 depict graphs of simulation results of the variable-stiffness mechanism, in accordance with one or more embodiments of the present disclosure.
Figure 3B:
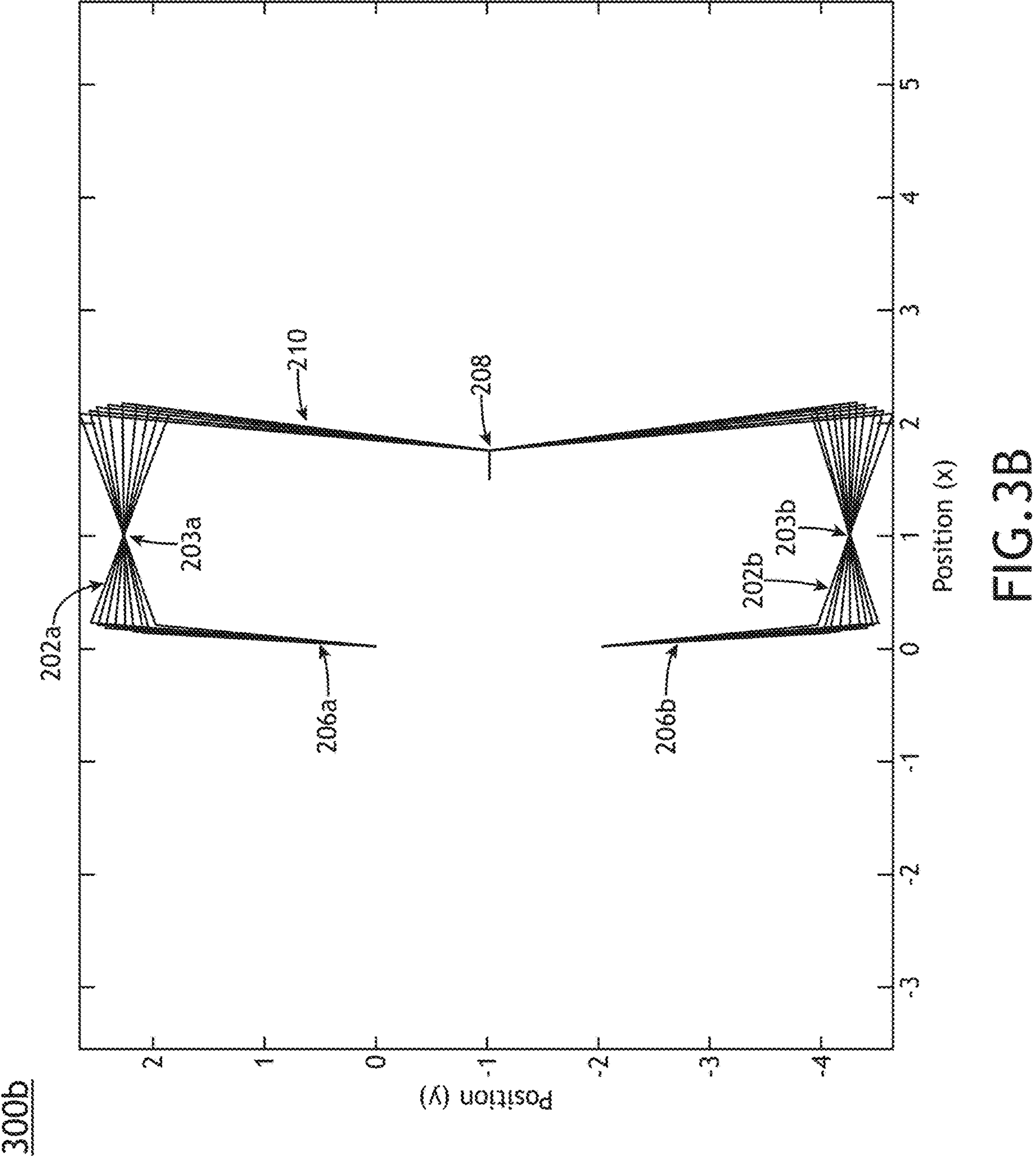
Figure 3C:
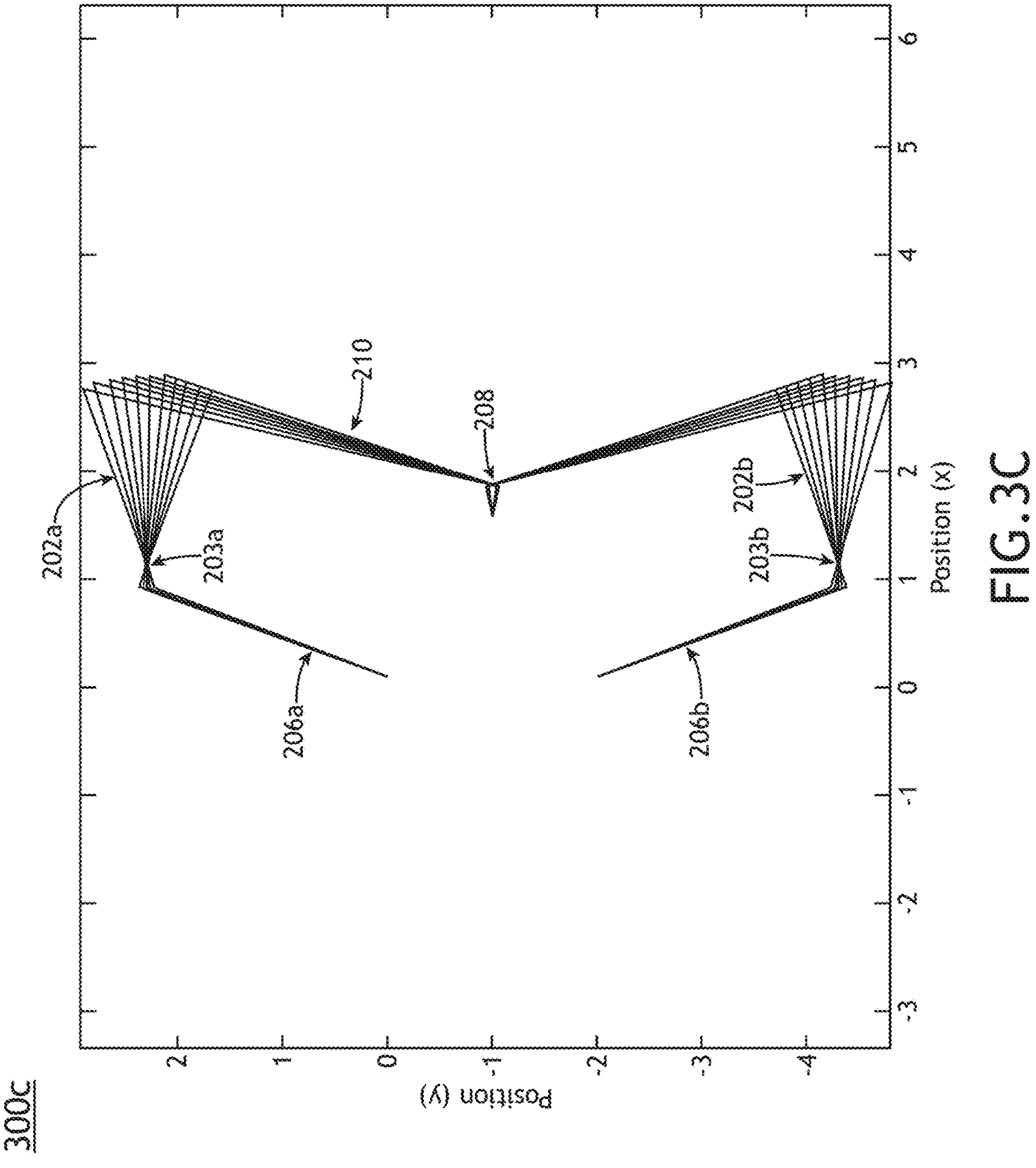

FIGS. 3A-3C depict graphs 300*a*-300*c*, in accordance with one or more embodiments of the present disclosure. The graphs 300*a*-300*c* depict time-lapse motion of the variable-stiffness mechanism 102 at various stiffnesses. Radii at the points of tangency between the cable 210 and pulley 208 are also shown to give a sense of the location and size of the pulley 208. The graph 300*a* illustrates the gear-to-rack meshes 203 closest to the second end (B) with a highest stiffness. The graph 300*b* illustrates the gear-to-rack meshes 203 midway between the first end (A) and the second end (B) with a middle stiffness. The graph 300*c* illustrates the gear-to-rack meshes 203 closest to the first end (B) with a lowest stiffness.

Figure 4:
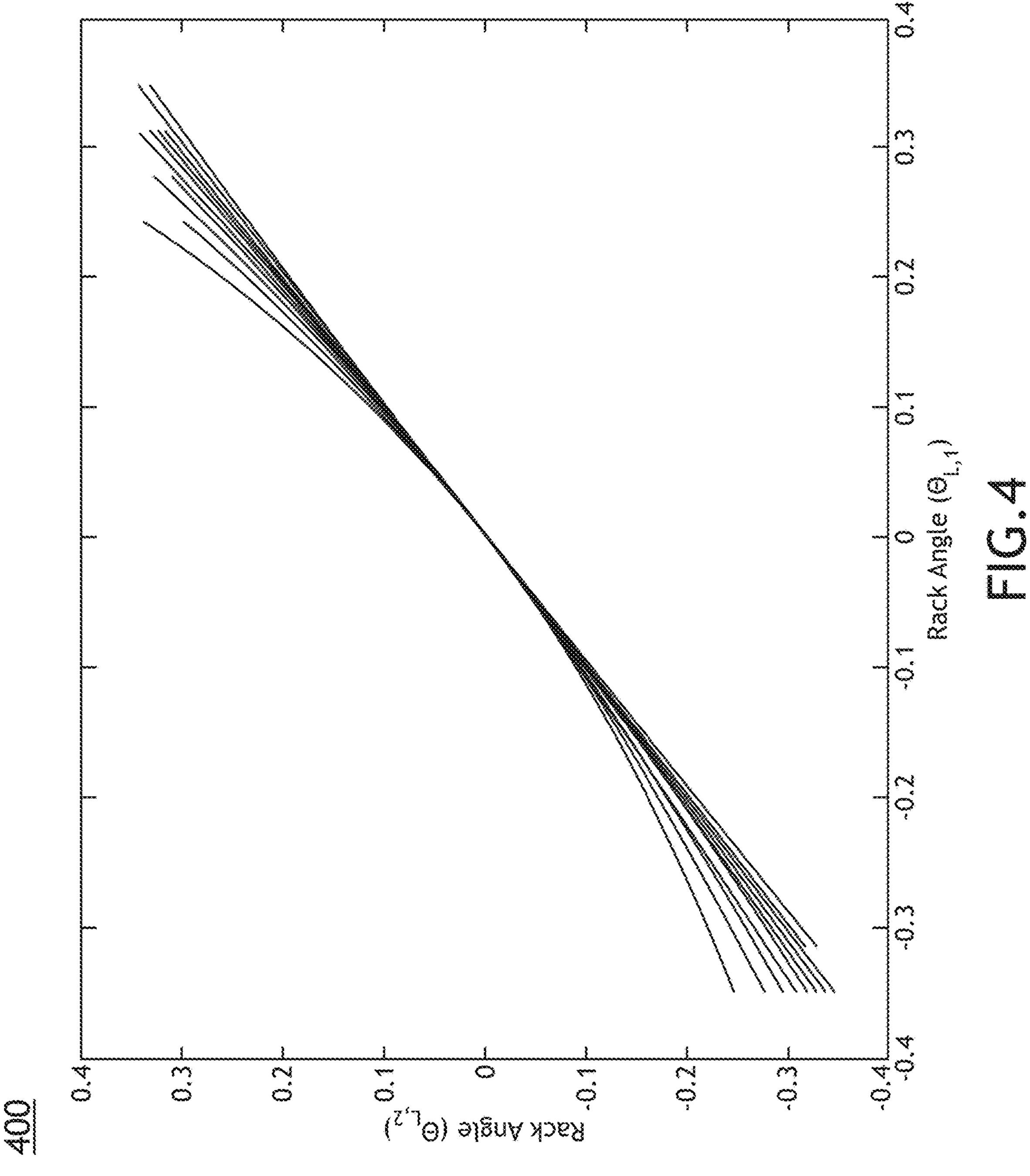

FIG. 4 depicts a graph 400, in accordance with one or more embodiments of the present disclosure. The graph 400 depicts the rack angle ($\Theta_{L,2}$) of the second rack 202*b* as a function of the rack angles ($\Theta_{L,1}$) first rack 202*a*, in radians. The rack angle ($\Theta_{L,2}$) of the second rack 202*b* may be referred to as the lower rack angle. The rack angle ($\Theta_{L,1}$) of the first rack 202*a* may be referred to as the upper rack angle. The nonlinear relationship between upper and lower rack angles ($\Theta_{L,i}$) is illustrated for various stiffness input settings. The nonlinear relationship may be due to small changes in the points of tangency on the pulley 208 and appears to have little effect on the overall results of the variable-stiffness mechanism 102.

Figure 5:
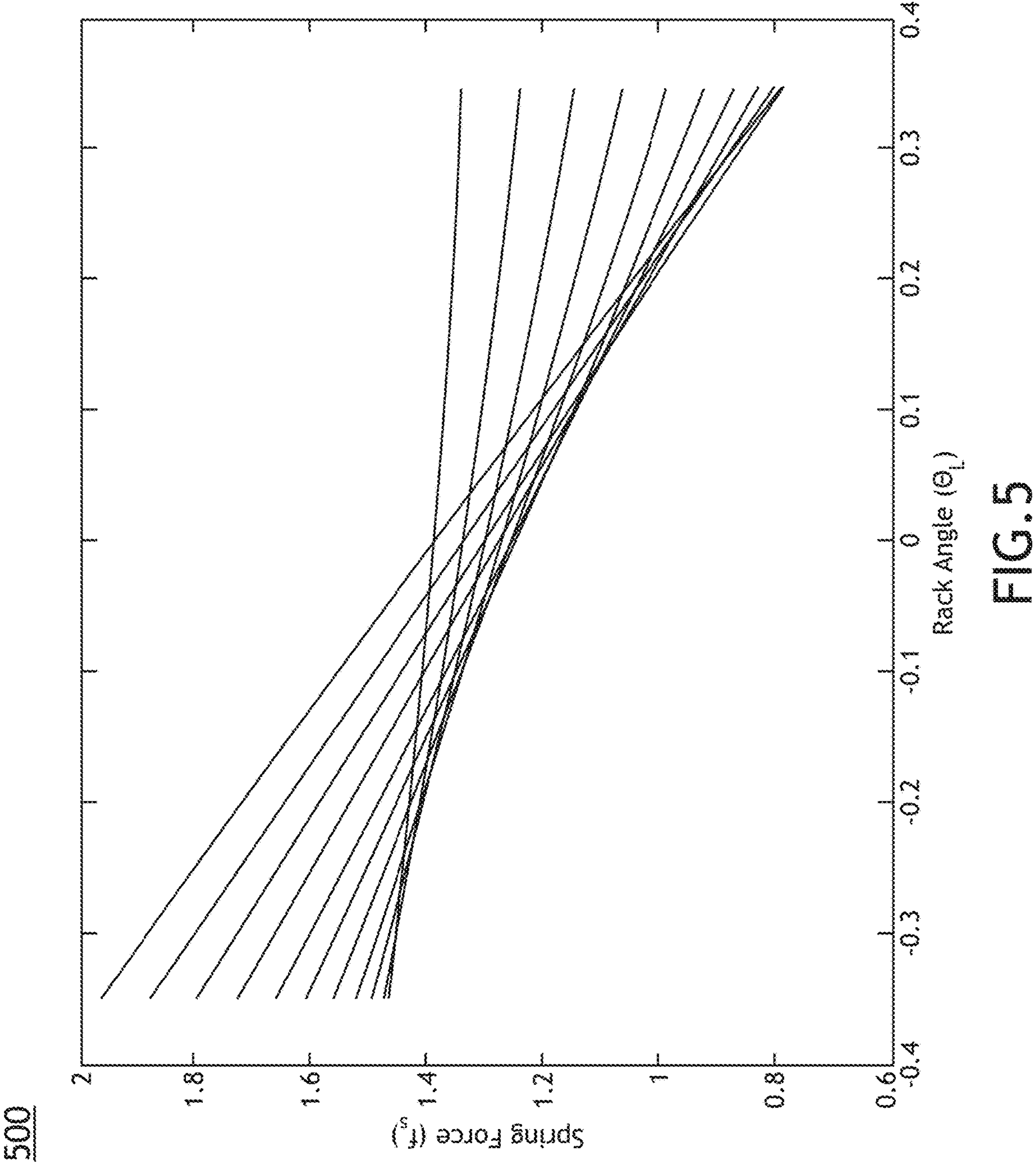

FIG. 5 depicts a graph 500, in accordance with one or more embodiments of the present disclosure. The graph 500 depicts the spring force ($f_s$) of the spring elements 206 as a function of rack angle ($\Theta_L$), in radians, over a range of stiffness input settings. The spring force ($f_s$) may also be referred to as spring tensile force. As the pinion gears 204 are rotated, thereby shifting the racks 202 towards the pulley 208 by shifting the gear-to-rack meshes 203 towards the first end (B), lower rates of spring force ($f_s$) are achieved, and vice versa. The change in rates of the spring force ($f_s$) is consistent with the operational intent of the variable-stiffness mechanism 102.

Figure 6A:
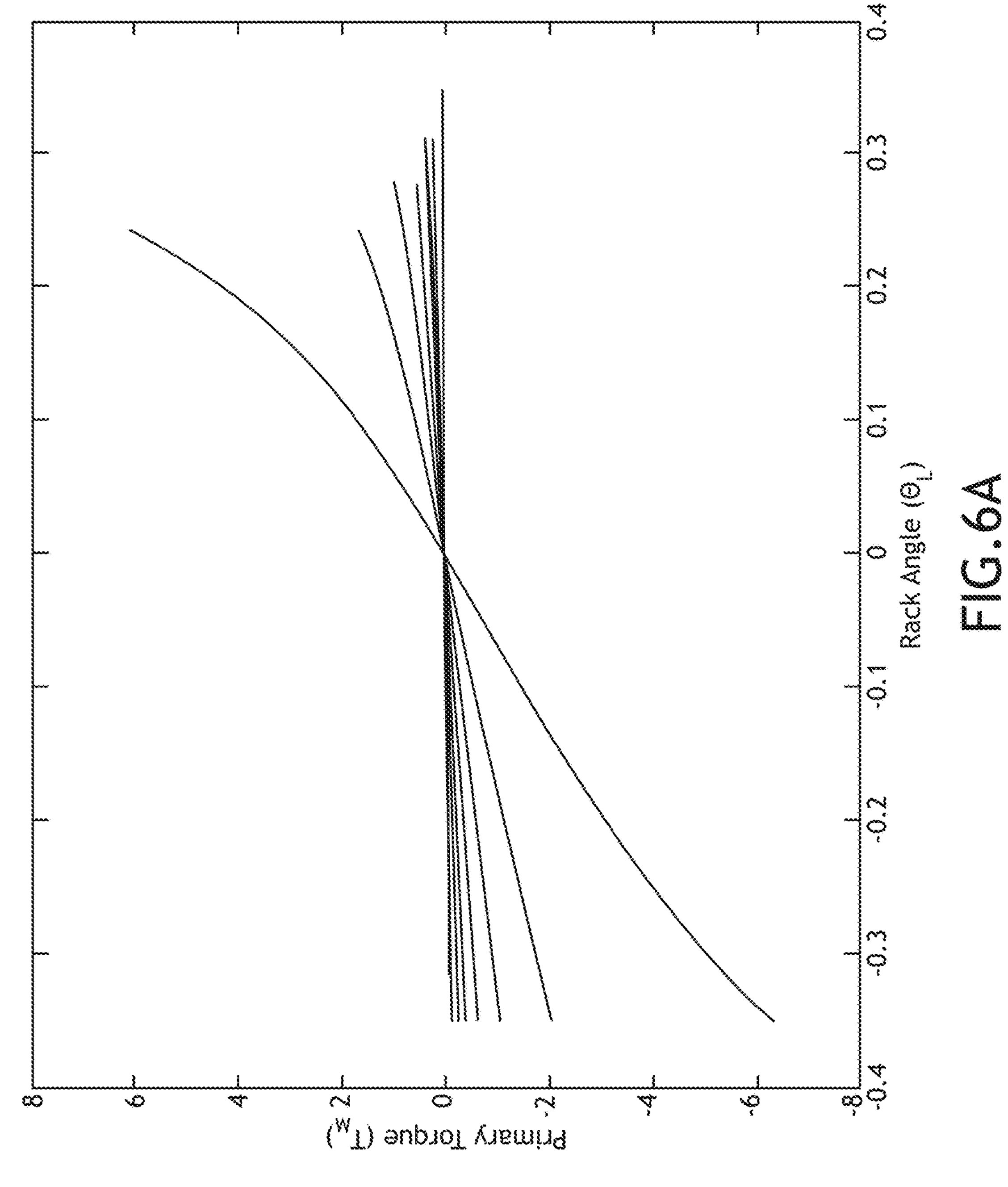
Figure 6B:
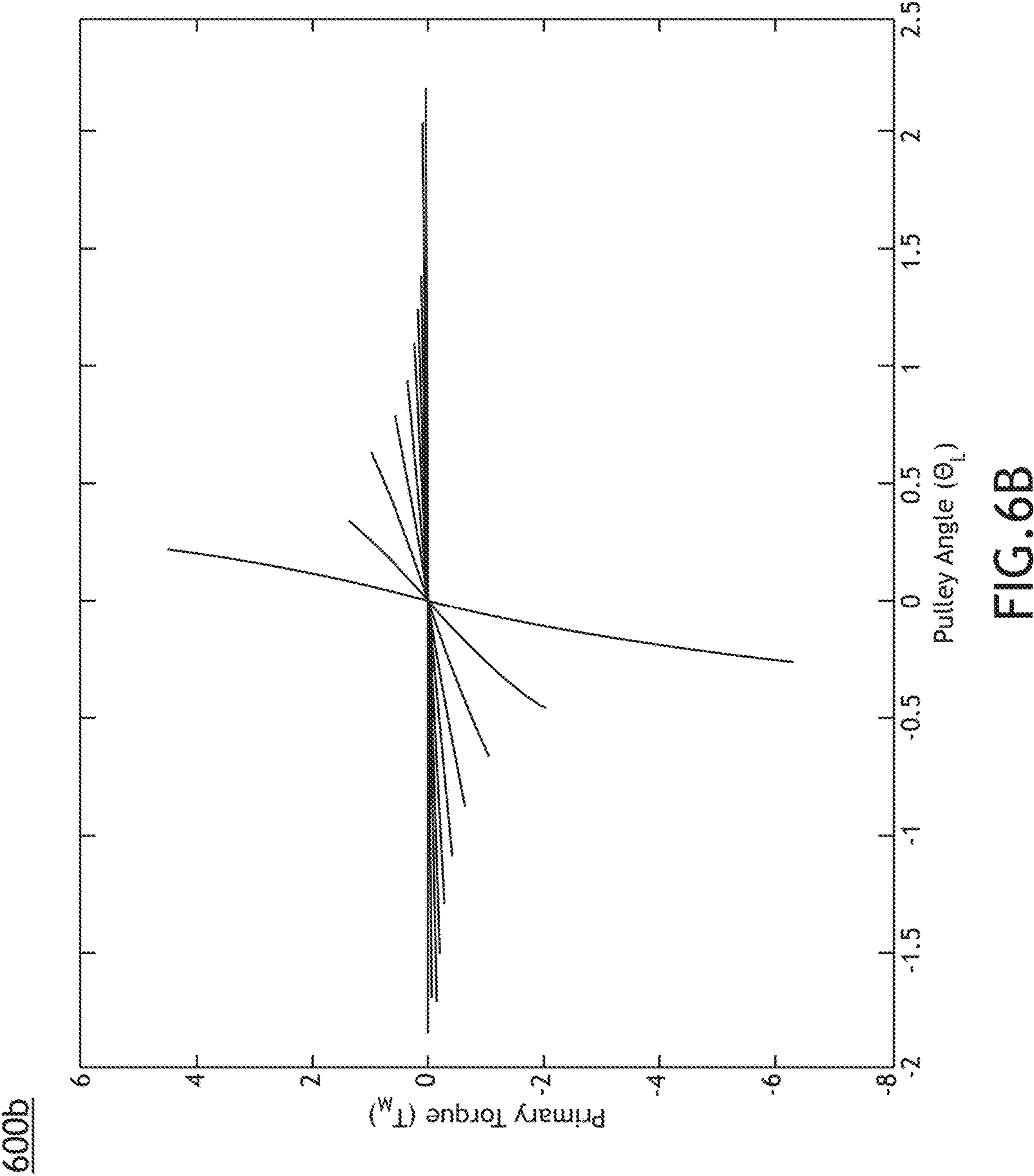

FIGS. 6A-6B depicts a graph 600*a* and a graph 600*b*, in accordance with one or more embodiments of the present disclosure. The graph 600*a* depicts the primary torque ($T_M$) as a function of the rack angle ($\Theta_L$), in radians. The graph 600*b* depicts the primary torque ($T_M$) as a function of the pulley angle ($\Theta_2$), in radians, of the pulley 208. The primary torque ($T_M$) may range from near zero to near infinite. The simulation results show the variable-stiffness mechanism 102 may achieve a large range of stiffness variation.

Figure 7:
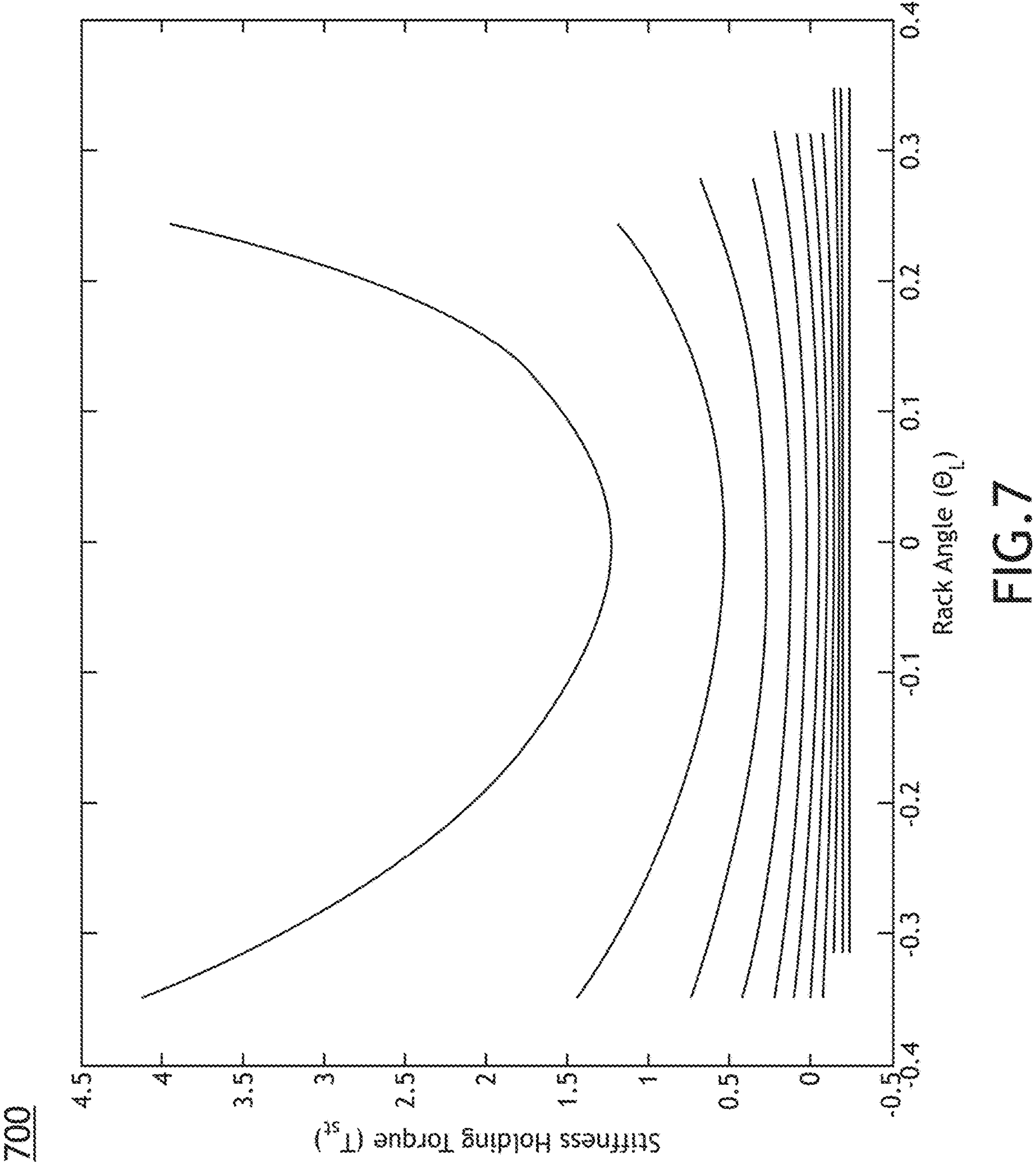

FIG. 7 depicts a graph 700, in accordance with one or more embodiments of the present disclosure. The graph 700 depicts the stiffness holding torque ($T_{st}$) as a function of the rack angle ($\Theta_L$), in radians. The stiffness holding torque ($T_{st}$) required in the stiffness input actuator is non-zero. As the primary torque ($T_M$) is increased, the stiffness holding torque ($T_{st}$) varies (tends to increase when departing from the neutral configuration). The analysis shows that the effort required to hold the stiffness holding torque ($T_{st}$) in the variable-stiffness mechanism 102 is strongly coupled to the primary torque ($T_M$), making the variable-stiffness mechanism 102 less efficient. The range of motion of the racks 202 may correspond to large or small angular displacements of the pulley angle ($\Theta_2$), depending on the pulley radius ($r_2$) of the pulley 208. In the above simulation, these parameters were selected arbitrarily with the purpose of illustrating the functionality and relationships of the variable-stiffness mechanism 102. The stiffness holding torque ($T_{st}$) required of the variable-stiffness mechanism 102 may not be symmetric with the position of the gear-to-rack meshes 203 along the racks 202. The differences shown are due in part to the change in spring extension of the spring elements 206 and loading angles on the racks 202 as the pinion gears 204 are adjusted. The curves corresponding to different stiffnesses may be spaced apart vertically and may not intersect even when the racks 202 are horizontal. The range of behavior simulated was based on the rack angle ($\Theta_L$) which naturally invokes higher stiffness holding torque ($T_{st}$) at higher primary torque ($T_M$).

Figure 8A:
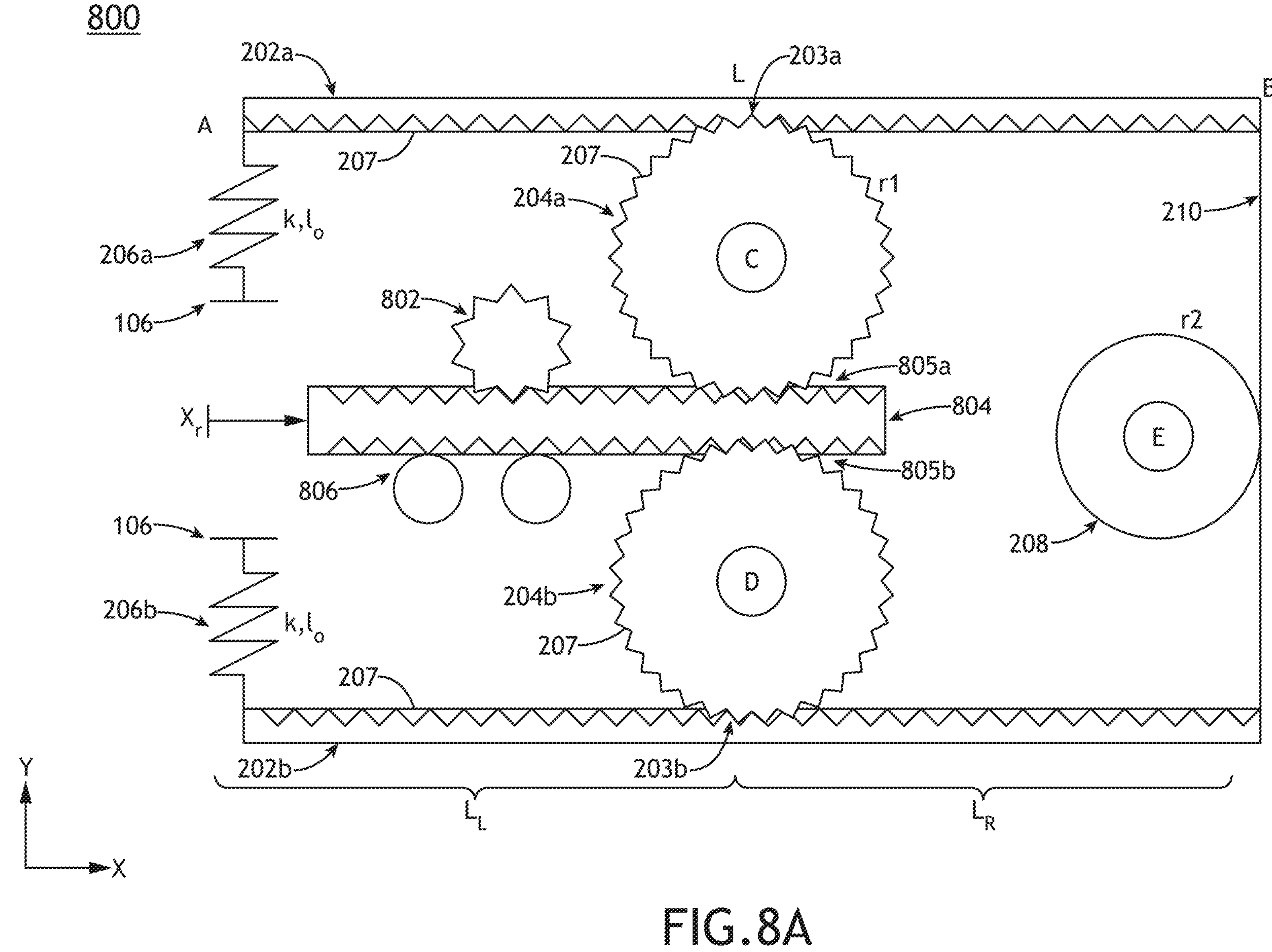
FIGS. 8A-8B depict a variable-stiffness mechanism, in accordance with one or more embodiments of the present disclosure.
Figure 8B:
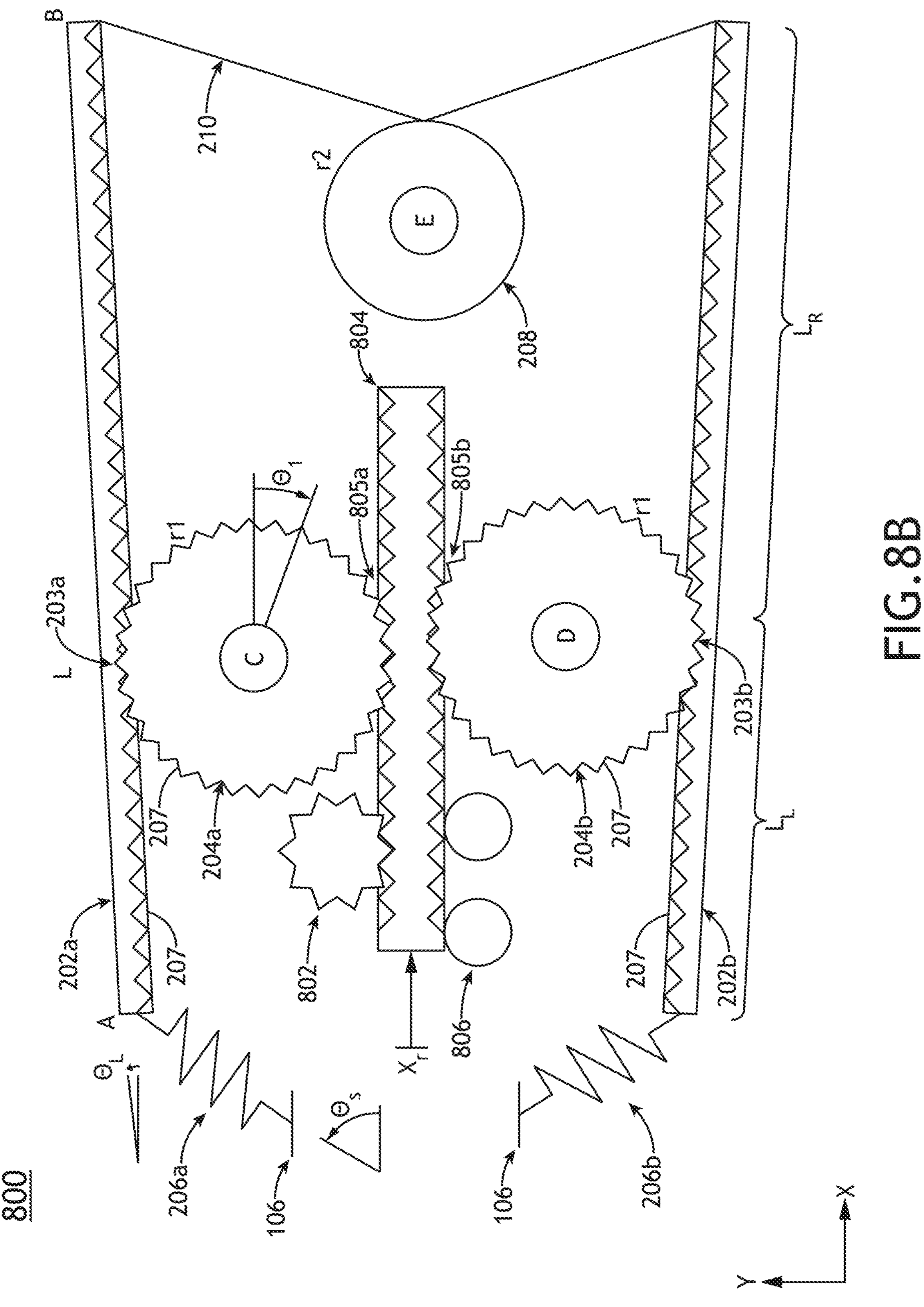

FIGS. 8A-8B depict a variable-stiffness mechanism 800, in accordance with one or more embodiments of the present disclosure. The discussion of the variable-stiffness mechanism 102 is incorporated herein be reference as to the variable-stiffness mechanism 800. The variable-stiffness mechanism 800 may be more mechanically complex than the variable-stiffness mechanism 102. The variable-stiffness mechanism 800 may additionally include a drive motor 802, a central drive rack 804, and/or idlers 806.

Although the center axes of the pinion gears 204 (i.e., center axis (C), center axis (D)), the center axis (E) of the pulley 208, and/or the local ground 106 have been described as in fixed in position relative to each other, this is not intended as a limitation of the present disclosure. The pinion gears 204 may be freely situated between the central drive racks 804 and the racks 202 without a fixed rotation center. The pinion gears 204 may translate laterally while floating adjacent to the racks 202. The pinion gears 204 may be configured to translate relative to the racks 202, the spring elements 206, the pulley 208, the cable 210, the local ground 106, and/or the actuator 104. Translating the pinion gears 204 relative to the racks 202, the spring elements 206, the pulley 208, the cable 210, the local ground 106, and/or the actuator 104 may promote a self-equilibrating behavior and/or improve the efficiency of the variable-stiffness mechanism 800. For example, the load in the gear-to-rack meshes 203 may be reduced by allowing the pinion gears 204 to translate relative to the racks 202, the spring elements 206, the pulley 208, the cable 210, the local ground 106, and/or the actuator 104 rather than having the center axes of the pinion gears 204 (i.e., center axis (C), center axis (D)) fixed relative to the center axis (E) of the pulley 208 and/or the local ground 106. The position of the center axes of the pinion gears 204 (i.e., center axis (C), center axis (D)) may be determined by equilibrium of forces rather than kinematic constraints alone. The position of the pinion gears 204 with respect to the racks 202 may then change the lever ratio. The change in the lever ratio may allow a wide range of stiffness values to be achieved and larger/smaller incremental changes to be accomplished without placing constant load on the spring elements 206.

Although the pinion gears 204 are described as coupling by the gear-to-gear mesh 205, this is not intended as a limitation of the present disclosure. The pinion gears 204 may be coupled through the central drive rack 804. The central drive rack 804 may be disposed between the pinion gears 204. For example, the central drive rack 804 may be vertically disposed between the pinion gears 204. The central drive rack 804 may be aligned with the center axis (E) of the pulley 208. For example, the central drive rack 804 may be vertically aligned with the center axis (E) of the pulley 208.

The pinion gears 204 and the central drive rack 804 may couple by a rack-to-pinion mesh 805. For example, the first pinion gear 204*a* and the central drive rack 804 may couple by a first rack-to-pinion mesh 805*a*. By way of another example, the second pinion gear 204*b* and the central drive rack 804 may couple by a second rack-to-pinion mesh 805*b*.

The central drive rack 804 may be configured to translate relative to the pinion gears 204. Translation of the central drive rack 804 may rotate and/or translate the pinion gears 204 relative to the racks 202. The rotation and/or translation of the pinion gears 204 may change the position of the gear-to-rack meshes along the length of the racks 202, thereby varying the lever ratio between the moment arm of the spring force and the moment arm of the load acting through the cable 210. The central drive rack 804 may both support and provide motion to the pinion gears 204. The central drive rack 804 may include a central rack position ($x_r$) along which the central drive rack 804 is configured to translate relative to the pinion gears 204.

The drive motor 802 may be configured to translate the central drive rack 804. For example, the drive motor 802 may be coupled to the central drive rack 804 and configured to rotate. The rotation of the drive motor 802 may translate the central drive rack 804. Thus, the angular position of the drive motor 802 may control the central rack position ($x_r$), the rotation of the pinion gears 204, and/or the position of the gear-to-rack meshes 203.

The drive motor 802 may be at a fixed position relative to the local ground 106, the center axis (E) of the pulley 208, and/or the idlers 806.

The idlers 806 may be coupled to the central drive rack 804. The idlers 806 may support the central drive rack 804. For example, the idlers 806 may form a prismatic joint along which the central drive rack 804 is configured to translate. The idlers 806 may be idler wheels (as depicted) and/or idler gears. The central drive rack 804 may be disposed between the drive motor 802 and the idlers 806. For example, the central drive rack 804 may be vertically disposed between the drive motor 802 and the idlers 806.

The variable-stiffness mechanism 800 may be symmetric. For example, the racks 202, the pinion gears 204, the spring elements 206 and/or the cable 210 may be symmetric about the pulley 208 and/or the central drive rack 804. The symmetry of the variable-stiffness mechanism 102 may cause the equilibrium position when there is zero primary torque ($T_M$) on the pulley 208 to be constant for any position of the gear-to-rack meshes 203 along the length of the racks 202. The symmetry of the variable-stiffness mechanism 800 may ensure that the equilibrium position for zero load on the drive motor 802 is consistent regardless of the position of the gear-to-rack meshes 203, an angular position of the drive motor 802, and/or the central rack position ($x_r$).

Kinematic and force equilibrium models of the variable-stiffness mechanism 800 are now described. Forces on the pinion gears 204 may be in equilibrium. The pinion gears 204 may function as a 2-force member with one force from the central drive rack 804 and another force from the racks 202. The overall stiffness behavior of the primary torque ($T_M$) is a composite of the contributions from the first rack 202*a* and the second rack 202*b*. Defining the pinion gears 204 to be centered at (0, $r_1$) when the central drive rack 804 input is $x_r$=0 and the pinion angle ($\theta_1$) of the pinion gears 204 as zero, the geometry of the variable-stiffness mechanism 800 dictates the positions of the first end (A) and the second end (B) of the racks 202 as follows:

$$x_A = x_r - r_1\theta_1 - r_1\sin(\theta_L) - r_1(\theta_1 - \theta_L)\cos(\theta_L)$$

-continued $$y_A = r_1 + r_1\cos(\theta_L) - r_1(\theta_1 - \theta_L)\sin(\theta_L)$$

$$x_B = x_A + L\cos(\theta_L)$$

$$y_B = y_A + L\sin(\theta_L)$$

The spring force acting at the first end (A) has the spring angle ($\Theta_s$) and may be expressed as:

$$\theta_s = \operatorname{atan}\left(\frac{y_A - y_s}{x_A - x_s}\right)$$

The spring mount location (xs, ys) influences the amount of initial preload in the spring elements 206 at the neutral position when considering the free length ($l_0$). The spring length ($l_s$) and magnitude of the spring force ($f_s$) may be expressed as:

$$l_s = \sqrt{(y_A - y_s)^2 + (x_A - x_s)^2}$$

$$f_s = k(l_s - l_0)$$

Attaching the cable 210 to the racks 202 at the second end (B), the cable length ($l_{cable}$) and cable angle ($\Theta_{cable}$) may be determined by tangency constraints on the pulley 208 and may be expressed as:

$$l_{cable} = \sqrt{(y_B)^2 + (x_B - x_2)^2 - r_2^2}$$

$$\theta_{Cable} = \operatorname{atan}\left(\frac{y_B}{x_B - x_2}\right) + \operatorname{atan}\left(\frac{r_2}{l_{cable}}\right)$$

The rotation of the pulley 208 may be calculated based on the change in cable length ($l_{cable}$) with respect to the neutral position. Combining these sets of equations generates a relationship between the primary torque ($T_M$) applied at the pulley 208 and the angular displacement of the pulley 208 which preserves equilibrium of the forces and moments applied to each of the racks 202. The primary torque ($T_M$) as a function of rack angles may be expressed as:

$$T_m = r_2(t_2 - t_1)$$

Where $t_1$ is a first cable tension in the cable 210 between the first rack 202*a* and the pulley 208, and where $t_2$ is a second cable tension in the cable 210 between the pulley 208 and the second rack 202*b*. Force and moment equilibrium conditions for the first rack 202*a* (i=1) and the second rack 202*b* (i=2) may be expressed as:

$$f_s\cos(\theta_s) + t_i\cos(\theta_{cable}) = f_{Lx}$$

$$f_s\sin(\theta_s) + t_i\sin(\theta_{cable}) = f_{Ly}$$

$$f_s\sin(\theta_s - \theta_L)\,r_1(\theta_1 - \theta_L) = t_i\sin(\theta_{cable} - \theta_L)\,(L - r_1(\theta_1 - \theta_L))$$

Where $f_{Lx}$ and $f_{Ly}$ are the components of the force acting between the pinion gears 204 and the racks 202. Because the pinion gears 204 act as a 2-force member, with forces acting only at the points of engagement with the racks 202 and the central drive rack 804, the geometry of the contacts requires that:

$$\frac{f_{Lx}}{f_{Ly}} = \tan\left(\frac{\theta_L}{2}\right)$$

Furthermore, the effort required to hold a given stiffness (holding the central rack position $x_r$) is simply the sum of $f_{Lx}$ for the upper and lower mechanisms. It is desirable to both minimize $f_{Lx}$ and achieve a large range of variation in the primary torque ($T_M$) at the pulley 208. The design freedoms available to affect these outcomes include the placement of the center axis (E) of the pulley 208, the rack length (L), the spring properties and preload, and the pinion radius ($r_1$), and/or the pulley radius ($r_2$). Because the pinion gears 204 are configured to translate relative to the pulley 208, the effort required to hold a given stiffness is only due to the rack angle ($\Theta_L$). At the neutral position, no effort is required to hold the stiffness setting.

FIGS. 9A-14 depict graphs, in accordance with one or more embodiments of the present disclosure. The graphs are simulation results of the variable-stiffness mechanism 800. The rack angle ($\Theta_L$) was varied from −20 to 20 degrees, and the central rack position ($x_r$) was varied such that neutral rack orientations would produce the gear-to-rack meshes 203 within the middle 60% of the rack length. The results shown here are for $x_2$=1.5, $r_1$=0.5, $r_2$=0.25, and L=2. Spring properties were set as k=1 and $I_0$=0 (a zero-free length spring with unit-length preload at the neutral position). The parameter values were selected arbitrarily. The results of the simulation suggest further optimization may be acquired by tuning the parameters. For example, the parameters may be optimized for a range of stiffness settings of the system 100.

Figure 9A:
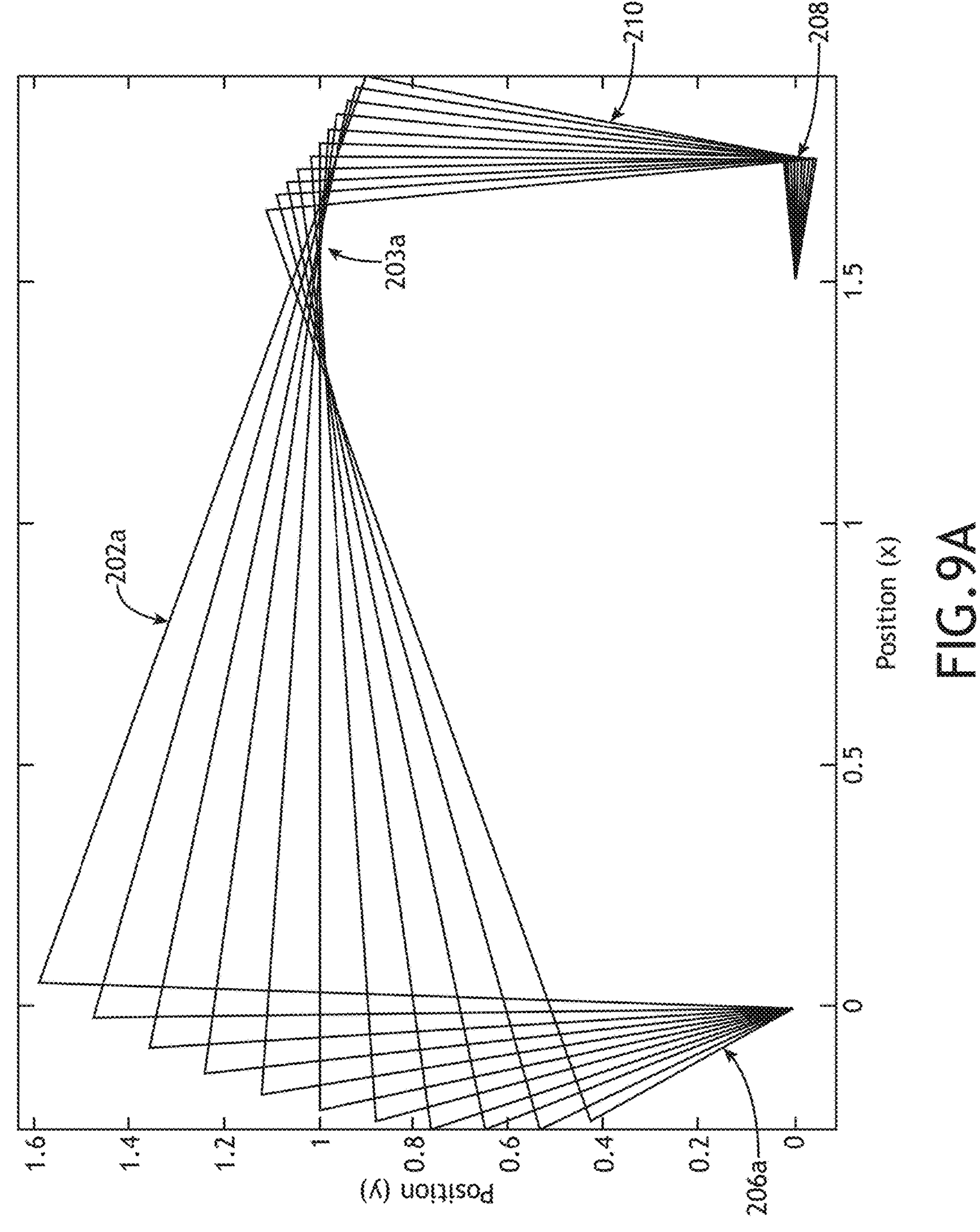
FIGS. 9A-9C, 10, 11, 12A-12B, 13A-13B, and 14 depict graphs of simulation results of the variable-stiffness mechanism, in accordance with one or more embodiments of the present disclosure.
Figure 9B:
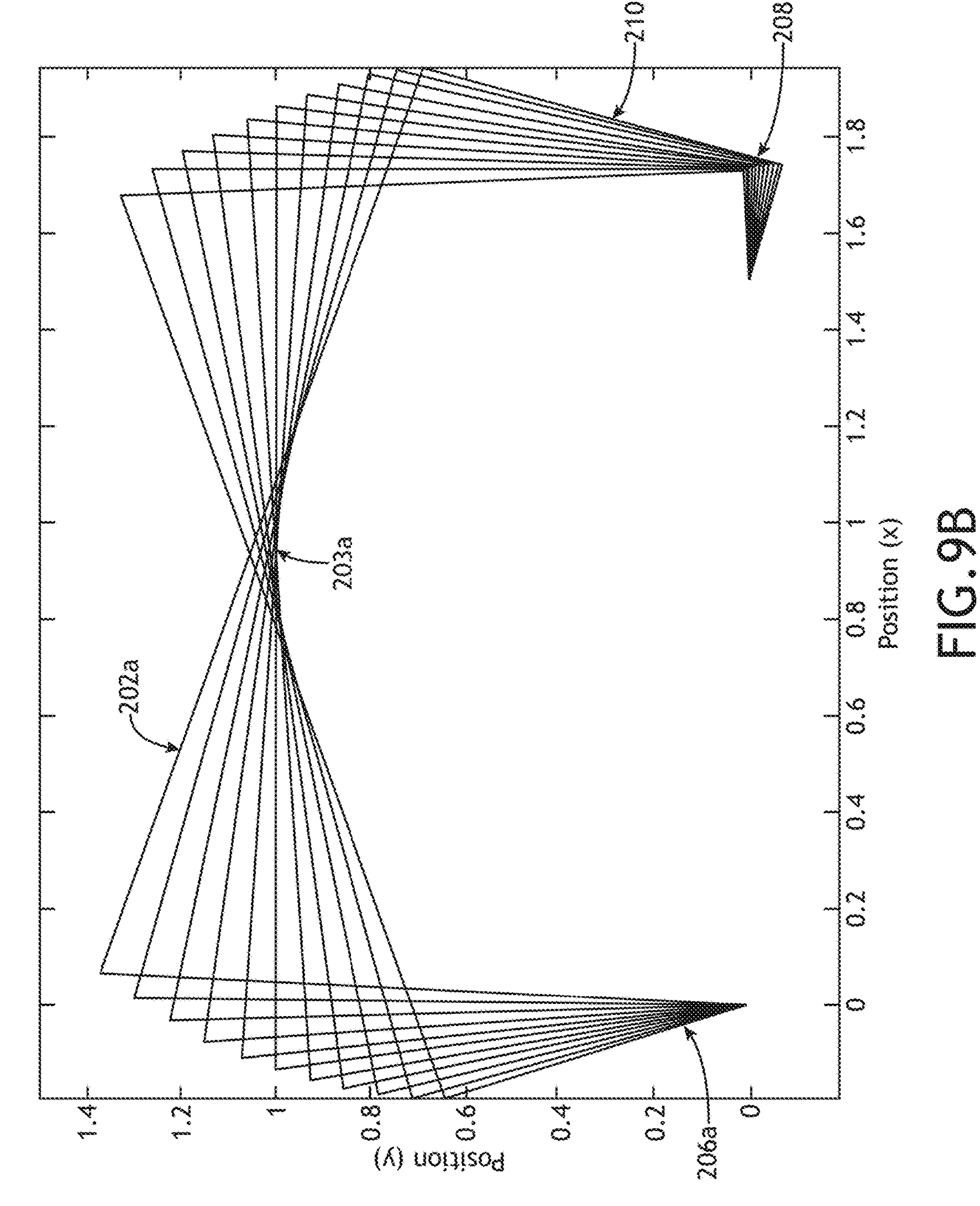
Figure 9C:
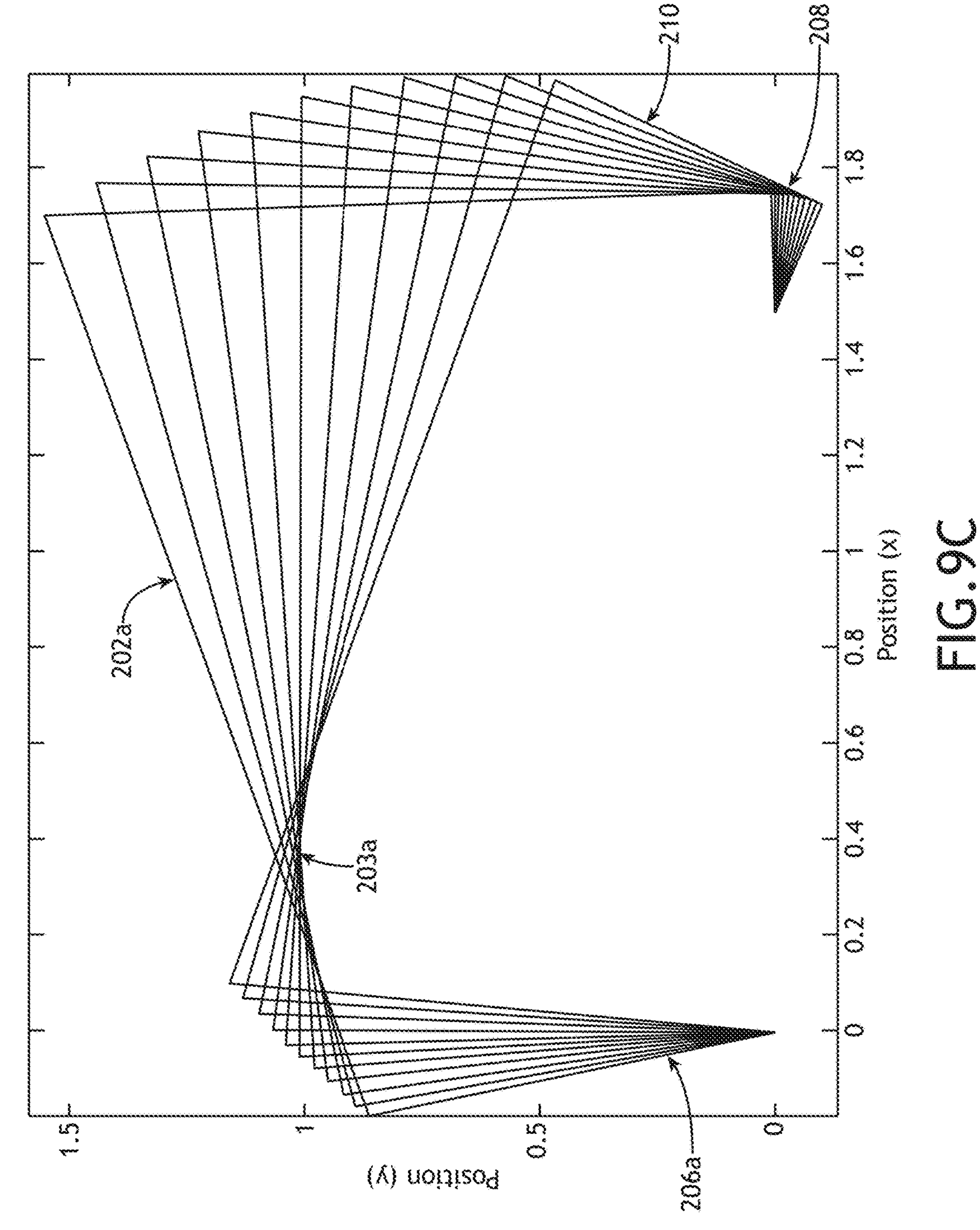

FIGS. 9A-9C depicts graphs 900*a*-900*c*, in accordance with one or more embodiments of the present disclosure. The graphs 900*a*-900*c* depict time-lapse motion of the variable-stiffness mechanism 102 at various stiffnesses. Radii at the points of tangency between the cable 210 and pulley 208 are also shown to give a sense of the location and size of the pulley 208. The graph 900*a* illustrates the gear-to-rack meshes 203 closest to the second end (B) with a highest stiffness. The graph 900*b* illustrates the gear-to-rack meshes 203 midway between the first end (A) and the second end (B) with a middle stiffness. The graph 900*c* illustrates the gear-to-rack meshes 203 closest to the first end (B) with a lowest stiffness. The graphs 900*a*-900*c* illustrate how the central rack position ($x_r$) influence the position of the gear-to-rack meshes 203 and changes the amount of displacement both in the cable 210 and in the spring elements 206. In these graphs only the motion of the first rack 202*a*, the first spring element 206*a*, and the cable 210 between the first rack 202*a* and pulley 208 is depicted.

Figure 10:
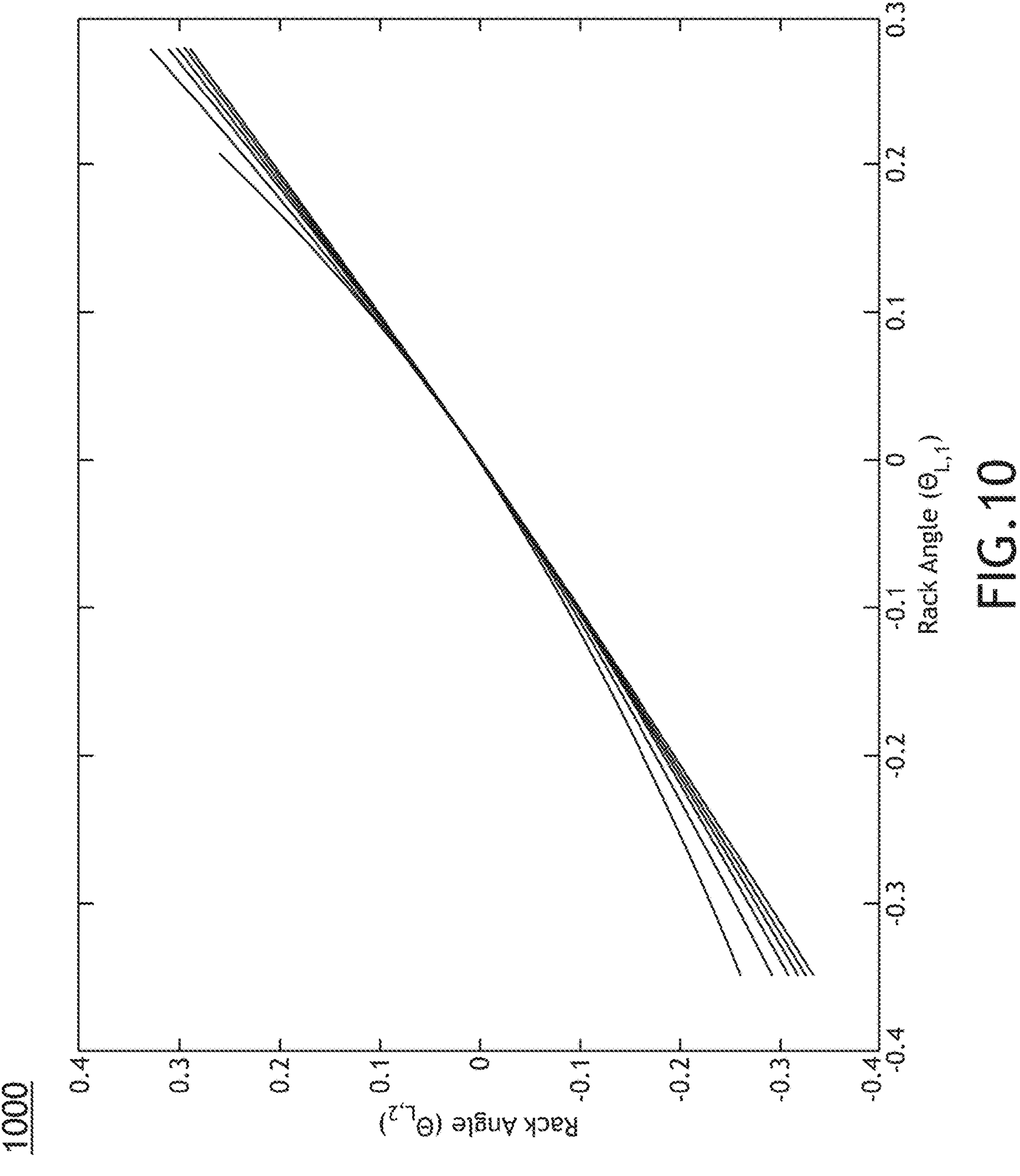

FIG. 10 depicts a graph 1000, in accordance with one or more embodiments of the present disclosure. The graph 1000 depicts the rack angle ($\Theta_{L,2}$) of the second rack 202*b* as a function of the rack angles ($\Theta_{L,1}$) first rack 202*a*, in radians. The nonlinear relationship between upper and lower rack angles ($\Theta_{L,i}$) is illustrated for a range of stiffness input settings. The nonlinear relationship may be due to a combination of small variations in the points of tangency on the pulley 208 and varying positions of the pinion gears 204, and appears to have little effect on the overall results of the variable-stiffness mechanism 800.

Figure 11:
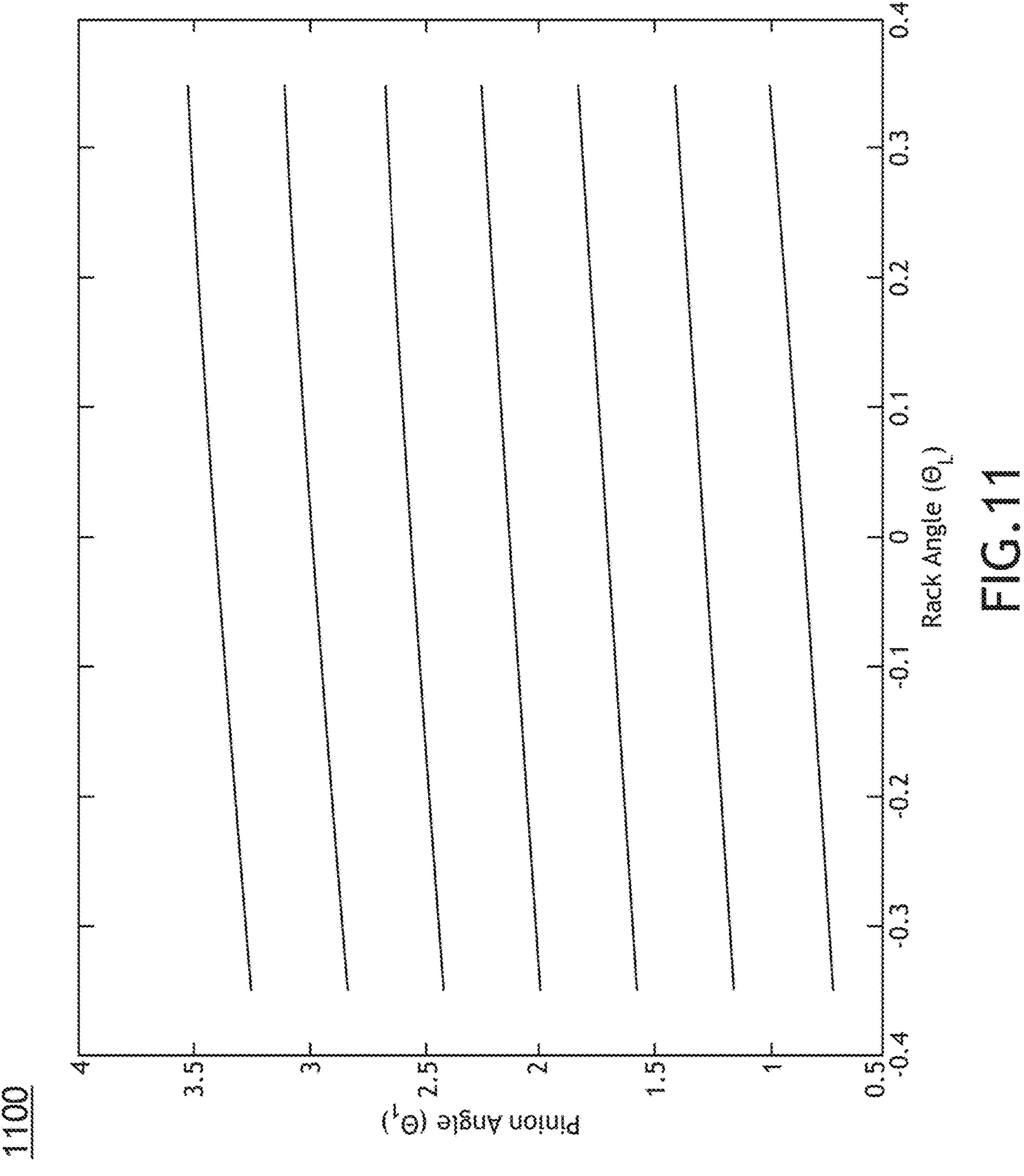

FIG. 11 depicts a graph 1100, in accordance with one or more embodiments of the present disclosure. The graph 1100 depicts the pinion angle ($\Theta_1$) as a function of rack angle ($\Theta_L$), in radians, for the range of stiffness settings. The variation in pinion angle ($\Theta_1$) illustrates the relationship with the rack angle ($\Theta_L$), subject to the equilibrium conditions. The pinion angle ($\Theta_1$) may increase as the rack angle ($\Theta_L$) is increased.

Figure 12A:
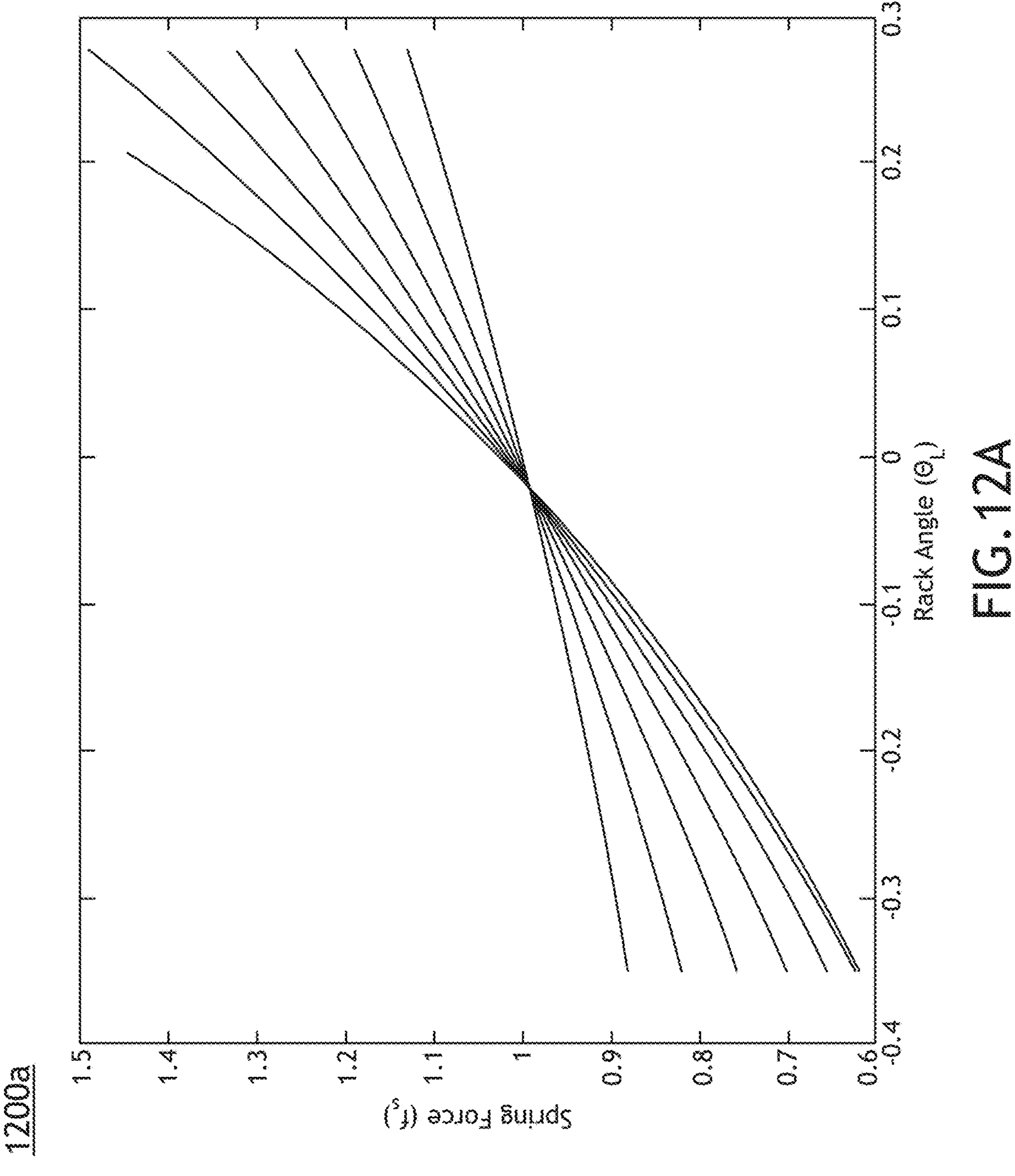
Figure 12B:
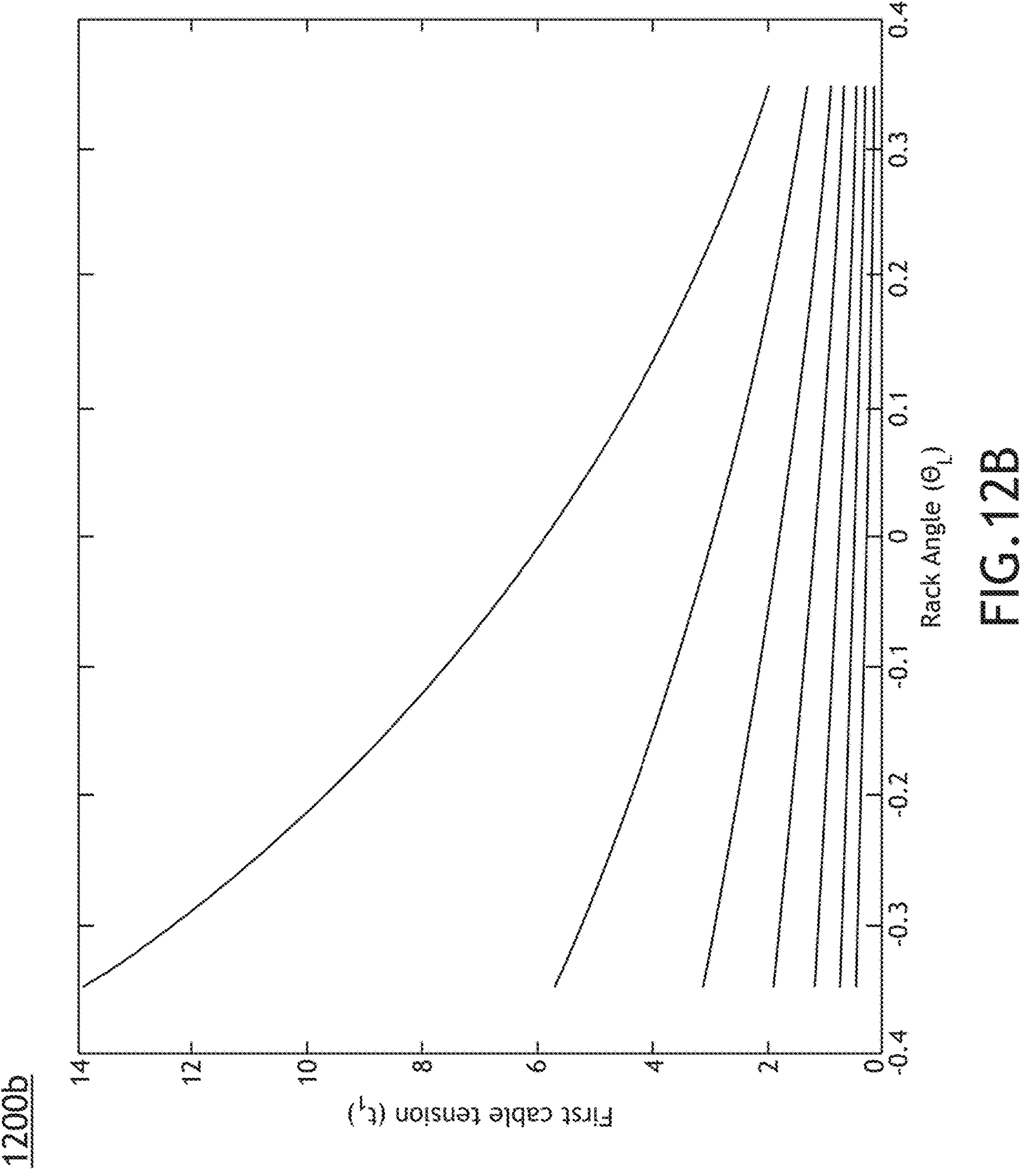

FIGS. 12A-12B depicts graphs 1200*a*-1200*b*, in accordance with one or more embodiments of the present disclosure. The graph 1200*a* depicts the spring force ($f_s$) of the spring elements 206 as a function of rack angle ($\Theta_L$), in radians, over a range of stiffness input settings. The graph 1200*b* depicts the first cable tension ($t_1$) as a function of rack angle ($\Theta_L$), in radians, over the range of stiffness input settings. As the displacement of the central rack position ($x_r$) is increased, the resulting shift of the gear-to-rack meshes 203 produces higher displacements of the spring elements 206 and/or higher spring forces ($f_s$) for a given rack angle ($\Theta_L$). The behavior is consistent with using the variable-stiffness mechanism 800 to modulate the primary torque ($T_M$).

Figure 13A:
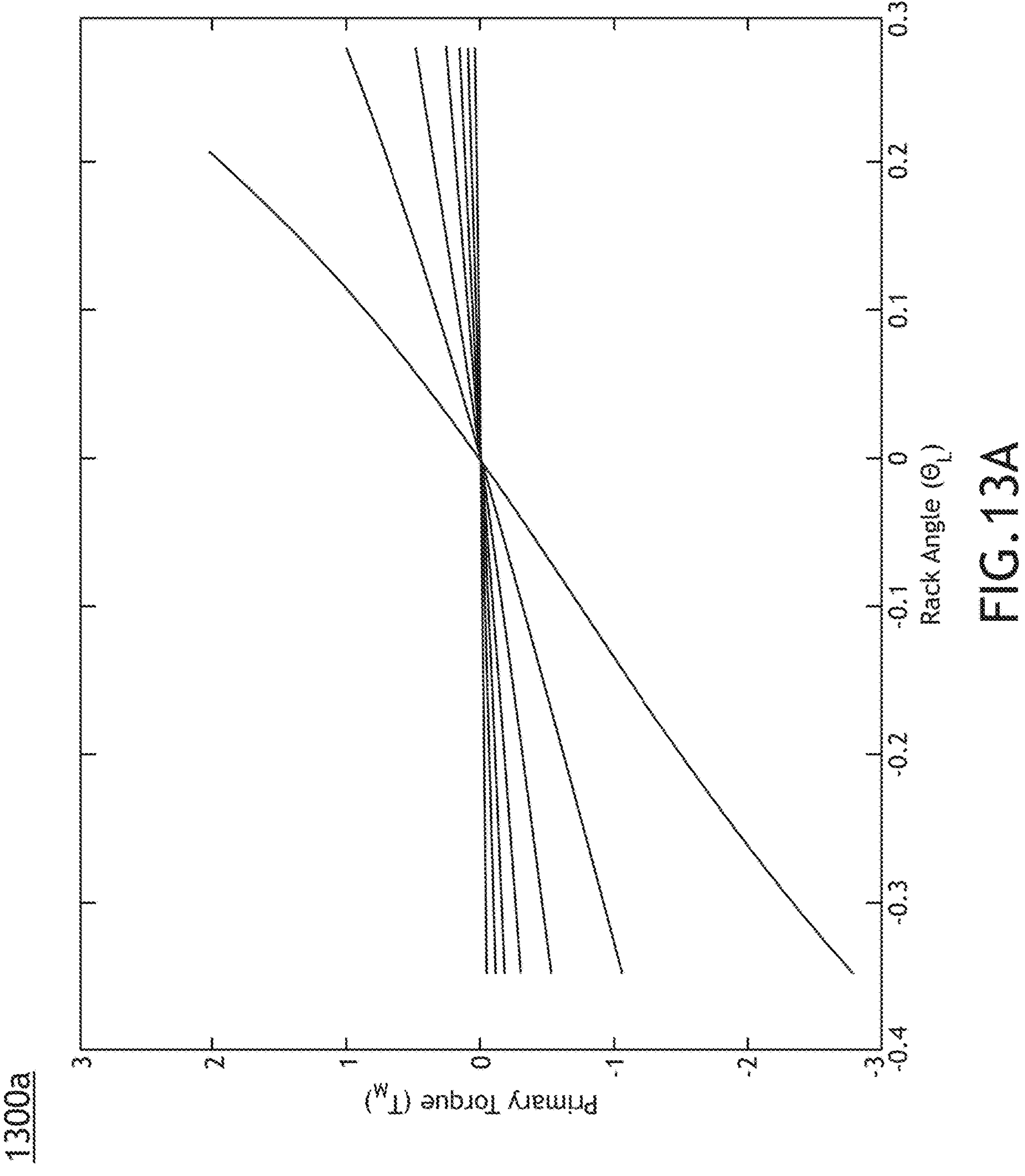
Figure 13B:
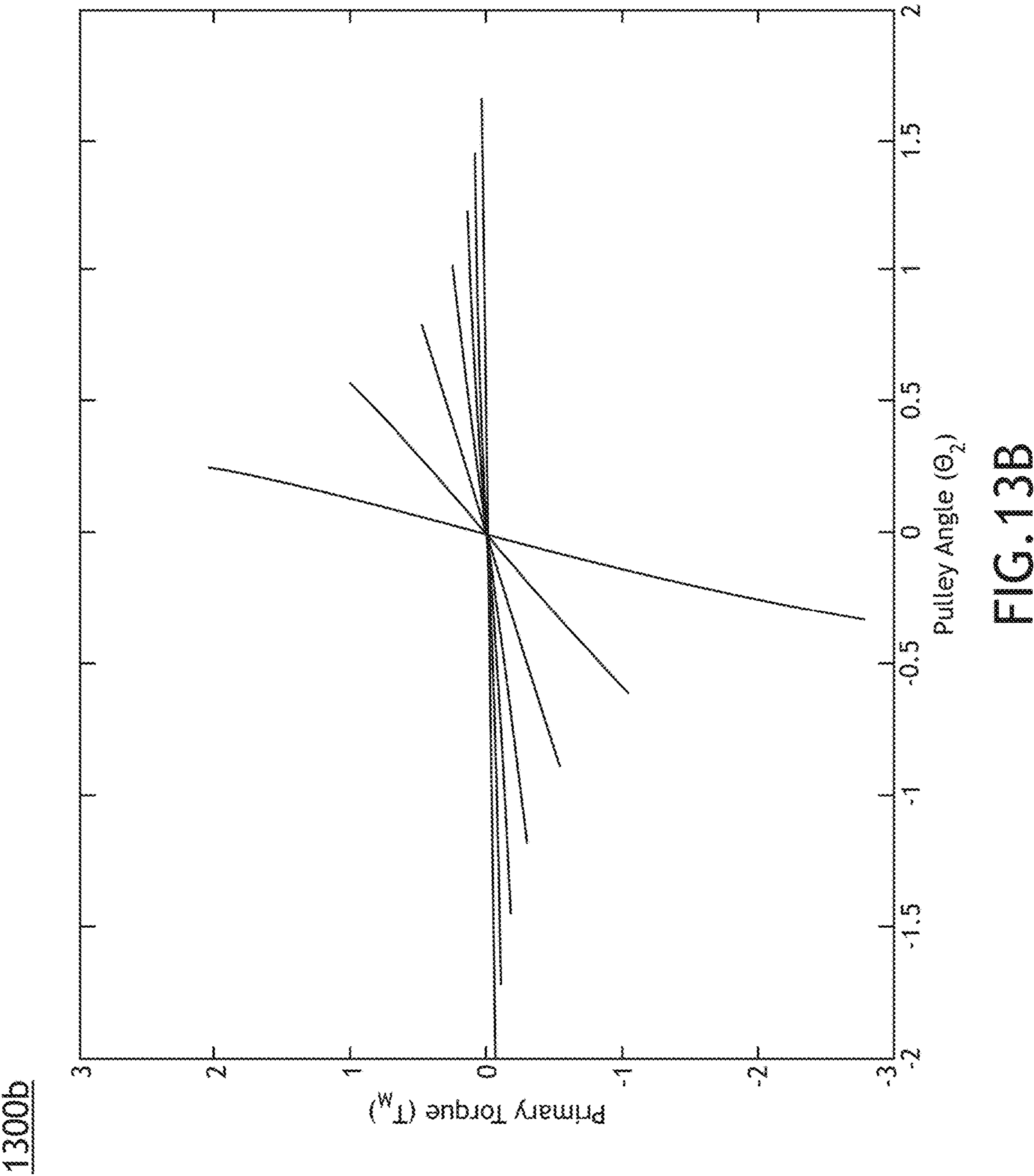

FIGS. 13A-13B depict graphs 1300*a*-1300*b*, in accordance with one or more embodiments of the present disclosure. The graph 1300*a* depicts primary torque ($T_M$) as a function of the rack angle ($\Theta_L$), in radians. The graph 1300*b* depicts the primary torque ($T_M$) as a function of the pulley angle ($\Theta_2$), in radians, of the pulley 208. The primary torque ($T_M$) may range from zero to near infinite.

Figure 14:
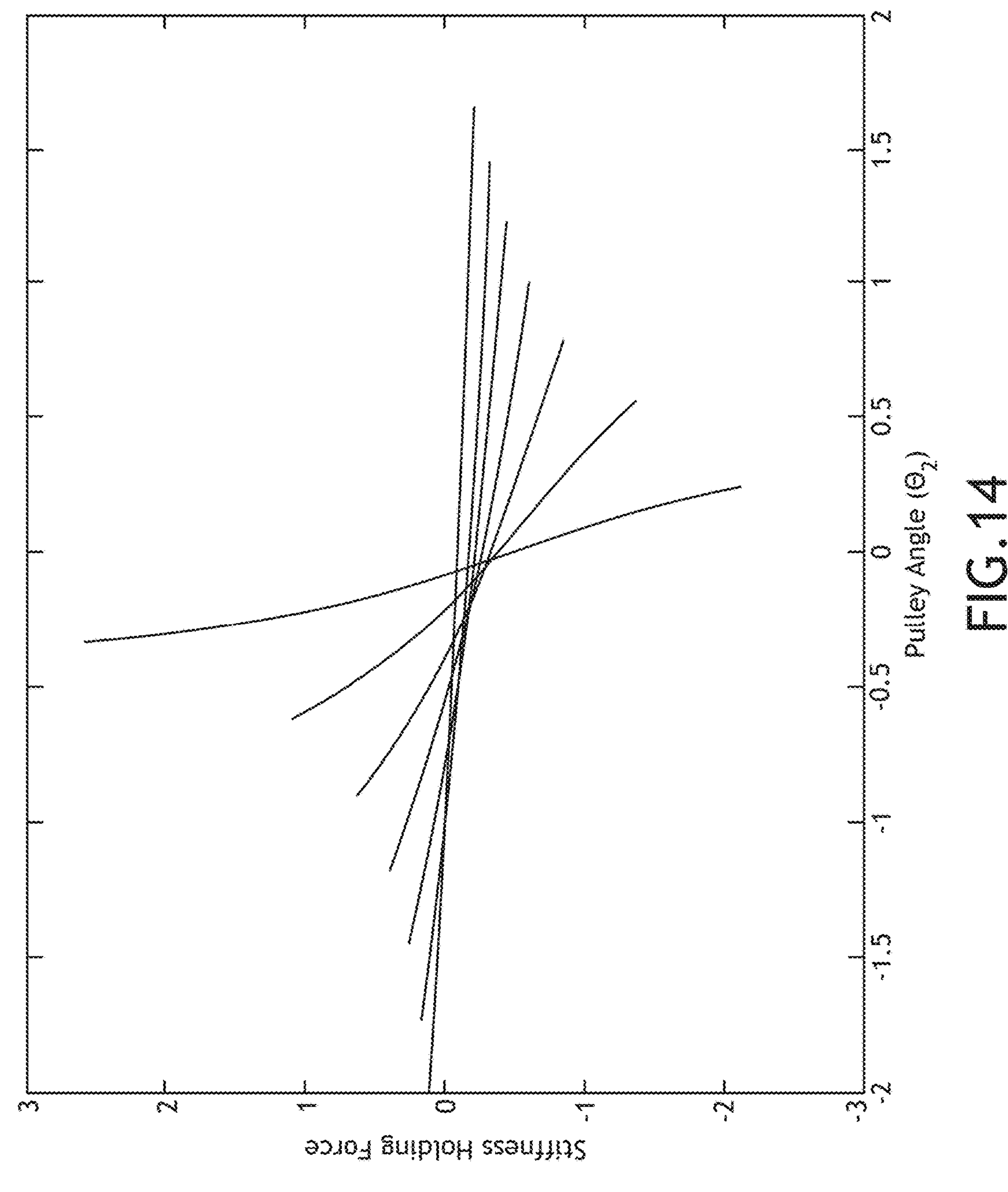

FIG. 14 depicts a graph 1400, in accordance with one or more embodiments of the present disclosure. The graph 1400 depicts the stiffness holding force as a function of the pulley angle ($\Theta_2$), in radians. The stiffness holding force may relate to the stiffness holding torque ($T_{st}$). The range of the rack angle ($\Theta_L$) may correspond to large or small angular output displacements, depending on the pulley radius ($r_2$), from the neutral position. Similarly, the stiffness holding torque ($T_{st}$) and/or the stiffness holding force may depend on the on the pulley radius ($r_2$). The variable-stiffness mechanism 800 may not require undue stiffness holding torque ($T_{st}$) to be held at a given primary torque ($T_m$). The graph 1400 shows the decrease in effort required to hold the stiffness setting as compared to the graph 700 of the variable-stiffness mechanism 102, which was simulated with the same dimensional and spring parameters. Noting that the input methods are different (one is a force and the other is a torque), normalizing the units by the factor $r_1$=0.5 shows that the level of effort required in the variable-stiffness mechanism 800 is roughly % of that in the variable-stiffness mechanism 102. The variable-stiffness mechanism 800 may include the reduction in the requirements without reducing the large range of output stiffness achievable.

Referring generally again to the figures. It is contemplated that the system 100, the variable-stiffness mechanism 102, and/or the variable-stiffness mechanism 800 may be used in a variety of applications. For example, the system 100, the variable-stiffness mechanism 102, and/or the variable-stiffness mechanism 800 may be used in robotics (e.g., soft robotics, humanoid robots, professional service robots with human interaction), manufacturing, rovers, automotive applications (e.g., dynamic vehicle suspension), and the like. The integration of variable mechanical properties, particularly variable stiffness, is of interest in view of a variety of applications in which such tunable properties could become advantageous.

The variable-stiffness mechanism 102 and/or the variable-stiffness mechanism 800 may or may not include a prismatic joint between the racks 202 and the pinion gears 204. The variable-stiffness mechanism 102 and/or the variable-stiffness mechanism 800 may provide the variable stiffness without the prismatic joint. The variable-stiffness mechanism 102 and/or the variable-stiffness mechanism 800 may provide a relative advantage by avoiding the complexity of the prismatic joint.

The variable-stiffness mechanism 102 and/or the variable-stiffness mechanism 800 may or may not include any means for preventing the gear-to-rack meshes 203 from translating outside the stable range between the first end (A) and the second end (B) of the racks 202. For example, the variable-stiffness mechanism 102 and/or the variable-stiffness mechanism 800 may include an intermittent-contact stop (not depicted) so that the gear-to-rack meshes 203 do not travel past the first end (A) and/or the second end (B).

It is further contemplated that each of the embodiments of the method described above may include any other step(s) of any other method(s) described herein. In addition, each of the embodiments of the method described above may be performed by any of the systems described herein.

One skilled in the art will recognize that the herein described components operations, devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components, operations, devices, and objects should not be taken as limiting.

As used herein, directional terms such as "top," "bottom," "over," "under," "upper," "upward," "lower," "down," and "downward" are intended to provide relative positions for purposes of description, and are not intended to designate an absolute frame of reference. Various modifications to the described embodiments will be apparent to those with skill in the art, and the general principles defined herein may be applied to other embodiments.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mixable and/or physically interacting components and/or wirelessly interactable and/or wirelessly interacting components and/or logically interacting and/or logically interactable components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A variable-stiffness mechanism comprising:

a first rack and a second rack;

a first pinion gear and a second pinion gear, wherein the first rack and the second rack are coupled with the first pinion gear and the second pinion gear by a first gear-to-rack mesh and a second gear-to-rack mesh, respectively, wherein the first rack and the second rack are configured to pivot about the first gear-to-rack mesh and the second gear-to-rack mesh, respectively, wherein rotation of the first pinion gear and the second pinion gear adjusts positions of the first gear-to-rack mesh and the second gear-to-rack mesh along the first rack and the second rack, respectively;

a first spring element and a second spring element, wherein the first spring element and the second spring element couple to the first rack and the second rack, respectively;

a cable, wherein the cable is coupled between the first rack and the second rack, wherein the first gear-to-rack mesh and the first pinion gear are laterally disposed between the first spring element and the cable, wherein the second gear-to-rack mesh and the second pinion gear are laterally disposed between the second spring element and the cable; and a pulley, wherein the cable is coupled with the pulley, wherein the first pinion gear, the second pinion gear, the pulley, and the cable are vertically disposed between the first rack and the second rack.

2. The variable-stiffness mechanism of claim 1, wherein the variable-stiffness mechanism comprises a stiffness at the pulley, wherein the stiffness is variable by changing the positions of the first gear-to-rack mesh and the second gear-to-rack mesh along the first rack and the second rack.

3. The variable-stiffness mechanism of claim 2, wherein the first rack and the second rack comprise a first end, a second end, and a rack length, wherein the first gear-to-rack mesh and the second gear-to-rack mesh are between the first end and the second end.

4. The variable-stiffness mechanism of claim 3, wherein the first spring element is coupled to the first end of the first rack, wherein the second spring element is coupled to the first end of the second rack.

5. The variable-stiffness mechanism of claim 3, wherein the second end of the first rack and the second rack are coupled to opposing ends of the cable.

6. The variable-stiffness mechanism of claim 3, wherein the stiffness is lowest when the first gear-to-rack mesh and the second gear-to-rack mesh are at the first end, wherein the stiffness is highest when the first gear-to-rack mesh and the second gear-to-rack mesh are at the second end, wherein the stiffness increases as the first gear-to-rack mesh and the second gear-to-rack mesh translate from the first end to the second end.

7. The variable-stiffness mechanism of claim 1, wherein the first spring element and the second spring element are vertically disposed between the first rack and the second rack.

8. The variable-stiffness mechanism of claim 1, wherein the first rack, the second rack, the first pinion gear, and the second pinion gear comprise a plurality of teeth, wherein the plurality of teeth comprise at least one of straight teeth, helical teeth, or worm teeth.

9. The variable-stiffness mechanism of claim 1, wherein the cable is wound over the pulley by which the cable is coupled with the pulley, wherein tension in the cable pulls the first rack against the first pinion gear and pulls the second rack against the second pinion gear.

10. The variable-stiffness mechanism of claim 1, wherein the first rack and the second rack comprise a same rack length, wherein the first pinion gear and the second pinion gear comprise a same pinion radius.

11. The variable-stiffness mechanism of claim 10, wherein the first rack, the second rack, the first pinion gear, the second pinion gear, the first spring element, and the second spring element are symmetric about the pulley.

12. The variable-stiffness mechanism of claim 1, wherein center axes of the first pinion gear, the second pinion gear, and the pulley are arranged in parallel, wherein the center axes are orthogonal to the first rack and the second rack.

13. The variable-stiffness mechanism of claim 1, wherein the first pinion gear and the second pinion gear are fixed in position relative to the pulley, wherein the first pinion gear is configured to translate the first gear-to-rack mesh along the first rack and the second pinion gear is configured to translate the second gear-to-rack mesh along the second rack while the first pinion gear and the second pinion gear remain at fixed positions relative to the pulley.

14. The variable-stiffness mechanism of claim 13, wherein the first pinion gear and the second pinion gear are coupled by a gear-to-gear mesh.

15. The variable-stiffness mechanism of claim 13, wherein at least one of the first pinion gear or the second pinion gear is a drive pinion gear.

16. The variable-stiffness mechanism of claim 1, wherein the first pinion gear and the second pinion gear are configured to translate relative to the pulley.

17. The variable-stiffness mechanism of claim 16, comprising a central drive rack, wherein the first pinion gear and the second pinion gear are coupled through the central drive rack, wherein the central drive rack is disposed between the first pinion gear and the second pinion gear, wherein the central drive rack is configured to translate relative to the first pinion gear and the second pinion gear, wherein translation of the central drive rack rotates and translates the first pinion gear and the second pinion gear relative to the first rack and the second rack.

18. The variable-stiffness mechanism of claim 17, wherein the central drive rack is aligned with the pulley.

19. The variable-stiffness mechanism of claim 17, comprising a drive motor, wherein the drive motor is configured to translate the central drive rack, wherein the drive motor is at a fixed position relative to the pulley.

20. The variable-stiffness mechanism of claim 19, comprising one or more idlers, wherein the one or more idlers support the central drive rack, wherein the central drive rack is disposed between the drive motor and the one or more idlers.

21. A system comprising:

a variable-stiffness mechanism comprising:

a first rack and a second rack;

a first pinion gear and a second pinion gear, wherein the first rack and the second rack are coupled with the first pinion gear and the second pinion gear by a first gear-to-rack mesh and a second gear-to-rack mesh, respectively, wherein the first rack and the second rack are configured to pivot about the first gear-to-rack mesh and the second gear-to-rack mesh, respectively, wherein rotation of the first pinion gear and the second pinion gear adjusts positions of the first gear-to-rack mesh and the second gear-to-rack mesh along the first rack and the second rack, respectively;

a first spring element and a second spring element, wherein the first spring element and the second spring element couple to the first rack and the second rack, respectively;

a cable, wherein the cable is coupled between the first rack and the second rack, wherein the first gear-to-rack mesh and the first pinion gear are laterally disposed between the first spring element and the cable, wherein the second gear-to-rack mesh and the second pinion gear are laterally disposed between the second spring element and the cable; and a pulley, wherein the cable is coupled with the pulley, wherein the first pinion gear, the second pinion gear, the pulley, and the cable are vertically disposed between the first rack and the second rack;

a local ground, wherein the first spring element is coupled between the first rack and the local ground, wherein the second spring element is coupled between the second rack and the local ground; and an actuator, wherein the pulley is coupled to the actuator.

22. The system of claim 21, wherein the first pinion gear and the second pinion gear are fixed in position relative to the pulley, wherein the first pinion gear is configured to translate the first gear-to-rack mesh along the first rack and the second pinion gear is configured to translate the second gear-to-rack mesh along the second rack while the first pinion gear and the second pinion gear remain at fixed positions relative to the pulley; and wherein the first pinion gear and the second pinion gear are coupled by a gear-to-gear mesh.

23. The system of claim 21, wherein the first pinion gear and the second pinion gear are configured to translate relative to the pulley; and wherein the variable-stiffness mechanism comprises a central drive rack, wherein the first pinion gear and the second pinion gear are coupled through the central drive rack, wherein the central drive rack is disposed between the first pinion gear and the second pinion gear, wherein the central drive rack is configured to translate relative to the first pinion gear and the second pinion gear, wherein translation of the central drive rack rotates and translates the first pinion gear and the second pinion gear relative to the first rack and the second rack.

* * * * *